US012679515B2

(12) United States Patent (10) Patent No.: US 12,679,515 B2
Oftedahl et al. (45) Date of Patent: Jul. 14, 2026

(54) HULL CLEANING ROBOT

(71) Applicant: Jotun A/S, Sandefjord (NO)

(72) Inventors: Geir Axel Oftedahl, Sandefjord (NO);
Anita Børve, Stathelle (NO); **Henning
Johnsen, Sanderfjord (NO); Bente
Helmers, Sandefjord (NO); Toril
Fjeldaas Rygg**, Tønsberg (NO)

(73) Assignee: Jotun A/S, Sandefjord (NO)

( * ) Notice: Subject to any disclaimer, the term of this
patent is extended or adjusted under 35
U.S.C. 154(b) by 888 days.

(21) Appl. No.: 17/910,423

(22) PCT Filed: Mar. 5, 2021

(86) PCT No.: PCT/EP2021/055611
§ 371 (c)(1),
(2) Date: Sep. 9, 2022

(87) PCT Pub. No.: WO2021/180588
PCT Pub. Date: Sep. 16, 2021

(65) Prior Publication Data
US 2023/0096404 A1 Mar. 30, 2023

(30) Foreign Application Priority Data
Mar. 9, 2020 (GB) ..................................... 2003391

(51) Int. Cl.
*B63B 59/08* (2006.01)
*B08B 1/34* (2024.01)
(Continued)

(52) U.S. Cl.
CPC ................ *B63B 59/08* (2013.01); *B08B 1/34*
(2024.01); *B25J 5/007* (2013.01); *B25J
9/1653* (2013.01);
(Continued)

(58) Field of Classification Search
CPC ... B63B 59/06; B63B 2059/065; B63B 59/08;
B63B 2059/082; B63B 2059/085; B63B
2059/087; B63B 59/10; B08B 1/34
See application file for complete search history.

(56) References Cited

U.S. PATENT DOCUMENTS 3,946,692 A 3/1976 Sierra et al.
8,506,719 B2 8/2013 Holappa et al.
(Continued)

FOREIGN PATENT DOCUMENTS

CN 205150187 U 4/2016
JP 50-117198 A 9/1975
(Continued)

OTHER PUBLICATIONS

PCT International Search Report & Written Opinion for correspond-
ing PCT Application No. PCT/EP2021/055611, mailed on Aug. 31,
2021, 20 pages.
(Continued)

*Primary Examiner* — Andrew Polay
(74) *Attorney, Agent, or Firm* — Dority & Manning, P.A.

(57) ABSTRACT

In one embodiment, there is disclosed a robot configured to
clean a surface of a coating having a König pendulum
hardness of less than 75 counts, the robot comprising: a
cleaning brush assembly comprising a lamellar cleaning
brush having a plurality of lamellas extending outwardly
from a brush core and having a height, the lamellar cleaning
brush arranged to rotate about its axis to apply a cleaning
action to the surface when it is in contact with the surface;
wherein the robot is configured to apply a degree of com-
pression of the brush on the surface such that the brush is
held in a position a distance, towards the surface of the
coating, away from an initial position at which the brush is
in contact with, but not deformed by, the surface of the (Continued)

coating, wherein said distance is less than 56% of the height of the plurality of lamellas.

25 Claims, 11 Drawing Sheets

(51) Int. Cl.

| | |
|---|---|
| *B25J 5/00* | (2006.01) |
| *B25J 9/16* | (2006.01) |
| *B25J 11/00* | (2006.01) |
| *B25J 13/00* | (2006.01) |
| *B25J 13/08* | (2006.01) |
| *B25J 15/00* | (2006.01) |
| *B25J 19/02* | (2006.01) |
| *B63B 59/06* | (2006.01) |

(52) U.S. Cl.

CPC ......... *B25J 11/0085* (2013.01); *B25J 13/006* (2013.01); *B25J 13/08* (2013.01); *B25J 15/0019* (2013.01); *B25J 19/02* (2013.01); *B63B 59/06* (2013.01); *B63B 2059/065* (2013.01)

(56) References Cited

U.S. PATENT DOCUMENTS

2014/0230711 A1* 8/2014 Lovelace ............... B62D 63/04
180/9.1

2016/0068240 A1 3/2016 Swain et al.
2019/0216211 A1* 7/2019 Swain ........................ B08B 1/12
2020/0353511 A1* 11/2020 Larsson .................... B08B 1/12

FOREIGN PATENT DOCUMENTS

| | | |
|---|---|---|
| JP | S61254271 A | 11/1986 |
| JP | H08207883 A | 8/1996 |
| JP | H08228641 A | 9/1996 |
| JP | 2016047518 A | 4/2016 |
| JP | 2019117084 A | 7/2019 |
| JP | 2021-515695 A | 6/2021 |
| JP | 2021-521057 A | 8/2021 |
| SU | 1065295 A1 | 1/1984 |
| WO | WO 2018/061122 A1 | 4/2018 |
| WO | WO 2019/039988 A1 | 2/2019 |
| WO | WO 2019/170888 A1 | 9/2019 |
| WO | WO 2019/203729 A1 | 10/2019 |

OTHER PUBLICATIONS

GB Search Report for corresponding Application No. GB2003391. 6, dated Sep. 7, 2020, 1 page.
Japanese Notice of Reasons for Rejection (w/ English translation) for corresponding Application No. 2022-554725, dated Jul. 2, 2024, 14 pages.
Office Action (w/ English translation) in corresponding JP Application No. 2024-173303, dated Oct. 7, 2025, in 4 pgs.

* cited by examiner

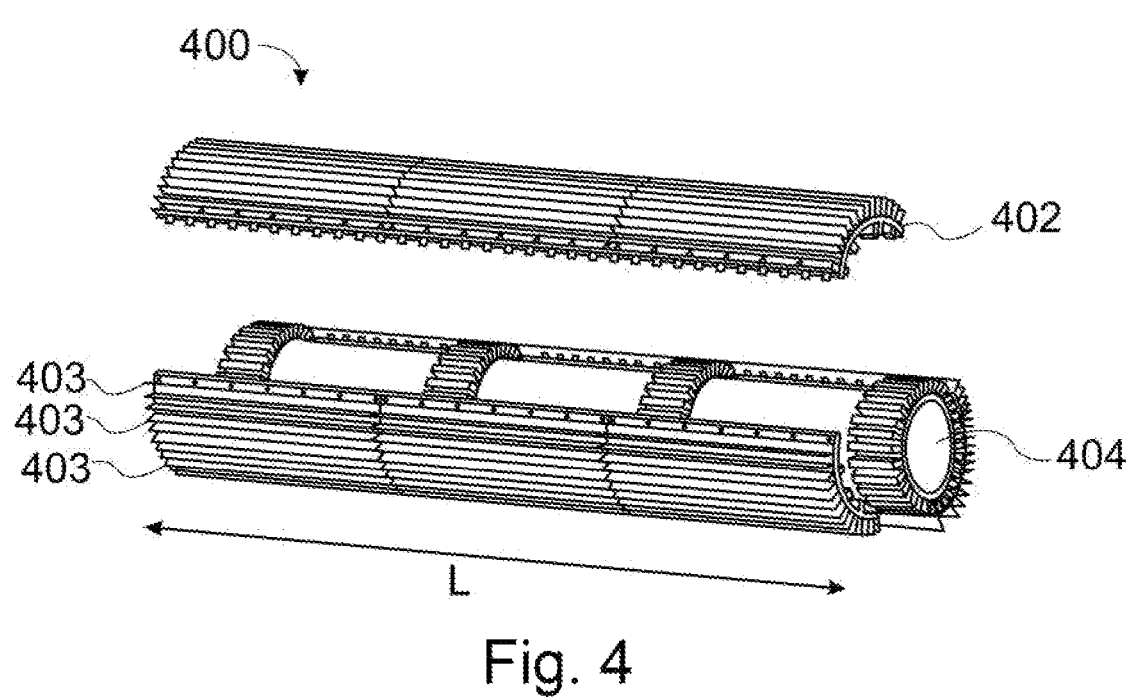
Fig. 4
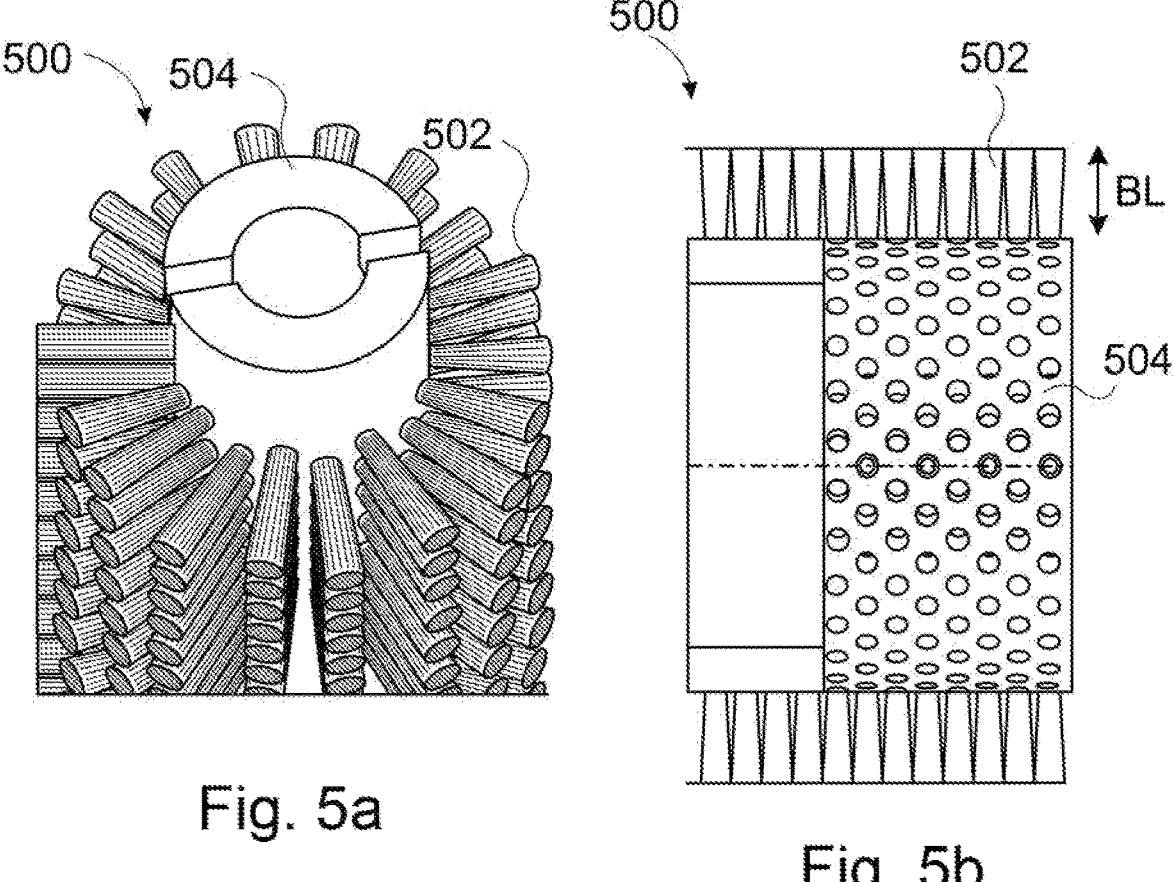
Fig. 5a
Fig. 5b

600

602

L

604

600

600

902                                                                              902 c

902

904 c

HULL CLEANING ROBOT

CROSS-REFERENCE TO RELATED APPLICATIONS

This application is a national 1 stage application of PCT international application PCT/EP2021/055611, filed on Mar. 5, 2021, which, in turn, claims priority to UK Patent Application No. 2003391.6, filed on Mar. 9, 2020, both of which are hereby incorporated by reference in their entireties for all purposes.

TECHNICAL FIELD

The present disclosure relates to a robot that is configured to clean a hull of a vessel whilst travelling over the hull, a kit for cleaning the hull of a vessel, and methods of cleaning a surface of a coating applied to a hull of a vessel.

BACKGROUND

All surfaces submerged in seawater will experience fouling of organisms such as bacteria, diatoms, algae, mussels, tube worms and barnacles. Marine fouling is the undesirable accumulation of microorganisms, algae and animals on structures submerged in seawater. The fouling organisms can be divided into microfouling (bacterial and diatomic biofilms) and macrofouling (e.g. macroalgae, barnacles, mussels, tubeworms, bryozoans) which live together forming a fouling community. In a simplistic overview of the fouling process, the first step is the development of a conditioning film where organic molecules adhere to the surface. This happens instantaneously when a surface is submerged in seawater. The primary colonizers, the bacteria and diatoms, will settle within a day. The secondary colonizers, spores of macroalgae and protozoa, will settle within a week. Finally, the tertiary colonizers, the larvae of macrofouling, will settle within 2-3 weeks.

The development of marine fouling is a known problem. On the hull of an actively trading vessel this will lead to increased drag resistance and increased fuel consumption or reduced speed. Increased fuel consumption will lead to increased $CO_2$, $NO_x$ and sulphur emissions. Many commercial vessels (e.g. container ships, bulk carriers, tankers, passenger ships) are trading worldwide. It is known that fouling organisms on the ship hull can be transported from one geographical area to another. This can be problematic if an invasive species is introduced into a new ecosystem with resulting ecological or commercial consequences.

Traditionally, antifouling coatings have been used to prevent the settlement and growth of marine organisms. The most efficient antifouling coatings contain biocides that will leak out from the coating film and thereby reduce the amount of fouling.

Robots, sometimes phrased as "crawlers" or ROVs (remotely operated vehicles), have also previously been used for cleaning of surfaces submerged in water e.g. for use on ship's hulls. Background art can be found in U.S. Pat. No. 8,506,719.

SUMMARY

The inventors have identified that whilst robots have previously been used for cleaning of surfaces submerged in water, the cleaning equipment has not been adjusted/fitted to optimize the removal of fouling as well as to avoid damaging the coating applied to the hull. A too aggressive cleaning operation will lead to excessive consumption of degradable coatings leading to excessive release of coating components including biocides into the environment and this will also result in shortening the lifetime of the coating. This is disadvantageous as the release of biocides to the environment should be kept at a minimum. A too aggressive cleaning operation will also damage and shorten the lifetime of the coating. A too aggressive cleaning operation can also damage any coating. Damages to a coated surface will also increase the drag resistance and increase fuel consumption or reduce the speed of the vessel.

Embodiments of the present disclosure relate to a robot configured to perform proactive cleaning of a hull of a vessel. This is beneficial as it is easier to remove the fouling in the early stages of the fouling process and to ensure that the vessels fuel consumption is kept at a minimum. Proactive cleaning is a gentle and frequent cleaning of the hull, abrasive enough to remove fouling but gentle enough not to affect coating integrity. This balance of enough abrasiveness for cleaning ability and gentle impact on the coated surfaces must be adjusted for different coating systems.

According to one aspect of the present disclosure there is provided a robot configured to clean a surface of a coating applied to a hull of a vessel whilst travelling over said hull, wherein the coating has a König pendulum hardness of less than 75 counts, the robot comprising: a cleaning brush assembly which comprises a lamellar cleaning brush, the lamellar cleaning brush comprising a plurality of lamellas extending outwardly from a brush core and having a height, the lamellar cleaning brush being arranged to rotate about its axis to apply a cleaning action to the surface when it is in contact with the surface; wherein the robot is configured to apply a degree of compression of the lamellar cleaning brush on the surface such that the lamellar cleaning brush is held in a position a distance, towards the surface of the coating, away from an initial position at which the lamellar cleaning brush is in contact with, but not deformed by, the surface of the coating, wherein said distance is less than 56% of the height of the plurality of lamellas.

The distance may be 5-56% of the height of the plurality of lamellas, more preferably 5-28% of the height of the plurality of lamellas and still more preferably 11-22% of the height of the plurality of lamellas.

The processor may be configured to control the robot to travel over an area of the hull such that each lamella applies a number of brush strokes during said cleaning action to said area, wherein said area has a width of 5 mm and a length corresponding to a length of the lamellar cleaning brush.

The number of brush strokes may be less than 5000, preferably 5 to 3400, more preferably 5-1280 and still more preferably 6-855.

In embodiments where the coating has pendulum hardness of less than 30 counts, the number of brush strokes is preferably less than 855.

The coating may have pendulum hardness of less than 30 counts.

The coating may have pendulum hardness between 30 to 74 counts.

The coating may comprise an antifouling agent.

According to another aspect of the present disclosure there is provided a robot configured to clean a surface of a coating applied to a hull of a vessel whilst travelling over said hull, wherein the coating has a König pendulum hardness between 30 to 74 counts, the robot comprising: a cleaning brush assembly which comprises a cleaning brush, the cleaning brush being arranged to rotate about its axis to apply a cleaning action to the surface when it is in contact with the surface, wherein the cleaning brush comprises bristles having a bristle length, the bristles having a bristle diameter of 1 mm or less; wherein the robot is configured to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is less than 20% of the bristle length of the bristles.

The distance may be 2-16% of the bristle length of the bristles, and more preferably 2-12% of the bristle length of the bristles.

The bristles may have a bristle diameter of 0.2 to 0.75 mm, preferably 0.3 to 0.6 mm.

The bristles of the cleaning brush may be arranged in a plurality of tufts mounted to a core of the cleaning brush. In these embodiments, the processor may be configured to control the robot to travel over an area of the hull such that each tuft of bristles applies a number of brush strokes during said cleaning action to said area wherein said area has a width of 5 mm and a length corresponding to a length of the cleaning brush. The number of brush strokes may be less than 1710, preferably 5 to 1280, more preferably 6 to 1280 and yet more preferably 6 to 855.

The bristles of the cleaning brush may be arranged in a plurality of brush strips. In these embodiments, the processor may be configured to control the robot to travel over an area of the hull such that each brush strip applies a number of brush strokes during said cleaning action to said area, wherein said area has a width of 5 mm and a length corresponding to a length of the cleaning brush. The number of brush strokes may be less than 1710, preferably 5 to 1280, more preferably 6 to 1280 and yet more preferably 6 to 855.

The coating may comprise an antifouling agent.

According to another aspect of the present disclosure there is provided a robot configured to clean a surface of a coating applied to a hull of a vessel whilst travelling over said hull, wherein the coating has a König pendulum hardness greater than or equal to 75 counts, the robot comprising: a cleaning brush assembly which comprises a cleaning brush, the cleaning brush being arranged to rotate about its axis to apply a cleaning action to the surface when it is in contact with the surface, wherein the cleaning brush comprises bristles having a bristle length, the bristles having a bristle diameter of 0.5 to 2 mm; wherein the robot is configured to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is 4 to 60% of the bristle length of the bristles.

The distance may be 4 to 48% of the bristle length of the bristles, and more preferably 4-28% of the bristle length of the bristles.

The bristles may have a bristle diameter of 0.5 to 1.5 mm.

The bristles of the cleaning brush may be arranged in a plurality of tufts mounted to a core of the cleaning brush. In these embodiments, the processor may be configured to control the robot to travel over an area of the hull such that each tuft of bristles applies a number of brush strokes during said cleaning action to said area, wherein said area has a width of 5 mm and a length corresponding to a length of the cleaning brush. The number of brush strokes may be less than 17,000, preferably 5 to 12,000, more preferably 6 to 10,000 and still more preferably 6 to 5000.

The bristles of the cleaning brush may be arranged in a plurality of brush strips. In these embodiments, the processor may be configured to control the robot to travel over an area of the hull such that each brush strip applies a number of brush strokes during said cleaning action to said area, wherein said area has a width of 5 mm and a length corresponding to a length of the cleaning brush. The number of brush strokes may be less than 17,000, preferably 5 to 12,000, more preferably 6 to 10,000 and still more preferably 6 to 5000.

The coating may comprise an antifouling agent.

In any of the above-described aspects of the present disclosure, the cleaning brush assembly may comprise a brush position adjustment mechanism for controlling said degree of compression.

The brush position adjustment mechanism may be manually adjustable to control said degree of compression. Alternatively, the brush position adjustment mechanism may be coupled to said processor, wherein the processor is configured to communicate with the brush position adjustment mechanism to control said degree of compression.

In any of the above-described aspects of the present disclosure, the processor may be configured to: determine a location of the robot on the hull of the vessel; query a memory coupled to said processor to identify a further coating applied to the hull of the vessel at said location; and determine that the robot requires reconfiguration based on the identified further coating.

The processor may be configured to determine a location of the robot on the hull of the vessel based on receiving location data from at least one of: a location sensor on the robot; a location sensor on the vessel, the robot comprising a communication interface for receiving the location data from said location sensor; and a computing device, the robot configured to receive the location data from the computing device via said communication interface.

In any of the above-described aspects of the present disclosure, the processor is configured to: determine a degree of fouling on the surface of a coating; and determine that the robot requires reconfiguration based on the degree of fouling.

The processor may be configured to control the robot to travel to a robot docking station on the vessel in response to the determination that the robot requires reconfiguration.

The brush position adjustment mechanism may be coupled to said processor, and the processor is configured to communicate with the brush position adjustment mechanism to vary said degree of compression in response to the determination that that the robot requires reconfiguration.

The processor may be configured to determine a degree of fouling on the surface of a coating based on receiving fouling data from at least one of: a fouling sensor on the robot; a fouling sensor on the vessel, the robot comprising a communication interface for receiving the fouling data from said fouling sensor; and a computing device, the robot configured to receive the fouling data from the computing device via said communication interface.

According to another aspect of the present disclosure there is provided a kit for cleaning the hull of a vessel, the kit comprising:

a robot configured to clean a surface of a coating applied to the hull of a vessel whilst travelling over said hull, the robot comprising a mechanism for coupling a cleaning brush to the robot; and one or more cleaning brush;

wherein the one or more cleaning brush comprises:

a lamellar cleaning brush comprising a plurality of lamellas extending outwardly from a brush core and having a height, wherein the robot is configured, when the lamellar cleaning brush is coupled to said mechanism, to apply a degree of compression of the lamellar cleaning brush on the surface such that the lamellar cleaning brush is held in a position a distance towards the surface of the coating, away from an initial position at which the lamellar cleaning brush is in contact with, but not deformed by, the surface of the coating, wherein said distance is less than 56% of the height of the plurality of lamellas.

a first bristle cleaning brush comprising bristles having a bristle length, the bristles having a bristle diameter of 1 mm or less, wherein the robot is configured, when the first bristle cleaning brush is coupled to said mechanism, to apply a degree of compression of the first cleaning brush on the surface such that the first bristle cleaning brush is held in a position a distance towards the surface of the coating, away from an initial position at which the first bristle cleaning brush is in contact with, but not deformed by, the surface of the coating, wherein said distance is less than 20% of the bristle length of the bristles.

a second bristle cleaning brush comprising bristles having a bristle length, the bristles having a bristle diameter of 0.5 to 2 mm, wherein the robot is configured, when the second bristle cleaning brush is coupled to said mechanism, to apply a degree of compression of the second cleaning brush on the surface such that the second bristle cleaning brush is held in a position a distance towards the surface of the coating, away from an initial position at which the cleaning brush is in contact with, but not deformed by, the surface of the coating, wherein said distance is 4 to 60% of the bristle length of the bristles.

According to another aspect of the present disclosure there is provided a method of cleaning a surface of a coating applied to a hull of a vessel, wherein the coating has a König pendulum hardness of less than 75 counts, the method comprising: coupling a lamellar cleaning brush to a robot, the lamellar cleaning brush comprising a plurality of lamellas extending outwardly from a brush core and having a height; configuring the robot to apply a degree of compression of the lamellar cleaning brush on the surface such that the lamellar cleaning brush is held in a position a distance, towards the surface of the coating, away from an initial position at which the lamellar cleaning brush is in contact with, but not deformed by, the surface of the coating, wherein said distance is less than 56% of the height of the plurality of lamellas; positioning the robot on the hull of the vessel; and controlling the robot to travel to across said surface, the lamellar cleaning brush being arranged to rotate about its axis to apply a cleaning action to the surface when it is in contact with the surface.

According to another aspect of the present disclosure there is provided a method of cleaning a surface of a coating applied to a hull of a vessel, wherein the coating has a König pendulum hardness between 30 to 74 counts, the method comprising: coupling a cleaning brush to a robot, wherein the cleaning brush comprises bristles having a bristle length, the bristles having a bristle diameter of 1 mm or less; configuring the robot to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is less than 20% of the bristle length of the bristles; positioning the robot on the hull of the vessel; and controlling the robot to travel to across said surface, the cleaning brush being arranged to rotate about its axis to apply a cleaning action to the surface when it is in contact with the surface.

According to another aspect of the present disclosure there is provided a method of cleaning a surface of a coating applied to a hull of a vessel, wherein the coating has a König pendulum hardness greater than or equal to 75 counts, the method comprising: coupling a cleaning brush to a robot, wherein the cleaning brush comprises bristles having a bristle length, the bristles having a bristle diameter of 0.5 to 2 mm; configuring the robot to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is 4 to 60% of the bristle length of the bristles; positioning the robot on the hull of the vessel; and controlling the robot to travel to across said surface, the cleaning brush being arranged to rotate about its axis to apply a cleaning action to the surface when it is in contact with the surface.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIG. 4 illustrates a lamellar brush;

FIGS. 5*a* and 5*b* illustrate a tufted roller brush

DETAILED DESCRIPTION

Embodiments will now be described by way of example only.

Figure 1:
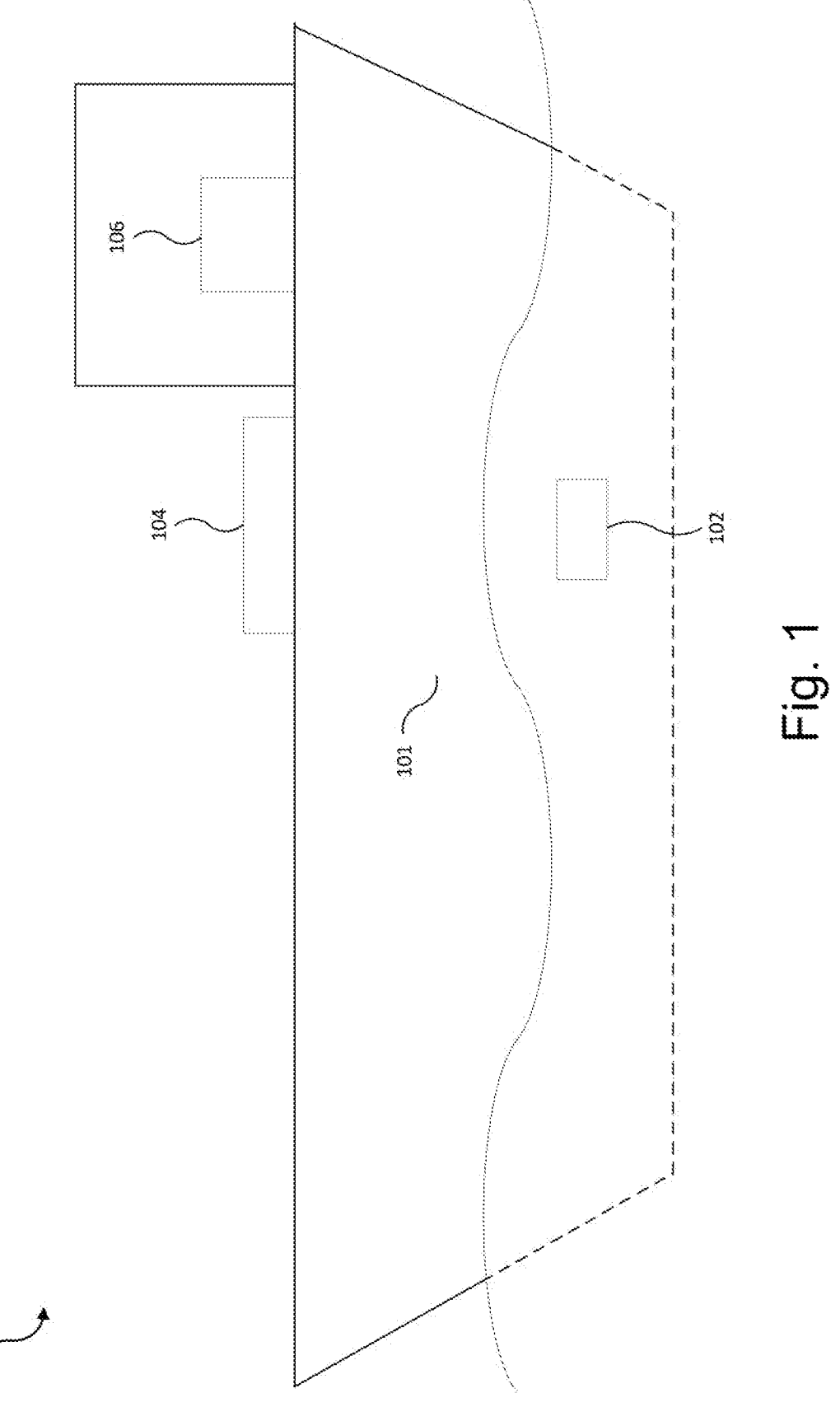
FIG. 1 illustrates a vessel and a robot.

FIG. 1 illustrates an aquatic vessel 100 for example a container ship, bulk carrier, tanker, or passenger ship. The aquatic vessel comprises a hull 101.

Before operation, a robot 102 will be stationary at a robot station 104 (a docking station) which may be used to charge the robot 102. The robot station 104 may be positioned on the vessel above the sea level as shown in FIG. 1. In some embodiments of the present disclosure, the robot station 104 allows for parking of the robot 102 when cleaning operations performed by the robot are paused. During cleaning of the surface of the hull 101, the robot 102 may traverse any surface of the hull 101 where marine fouling may form (e.g. a flat bottom or side bottom of the hull).

Reference to "cleaning" is used herein to refer to the removal of fouling organisms from the surface of the hull 101, such cleaning is sometimes referred to as "grooming" or "proactive cleaning". By performing the continual cleaning of the surface of the hull 101, the robot 102 typically performs removal of the initial conditioning film, where organic molecules have adhered to the surface of the hull 101 and/or primary colonizers and before secondary colonizers have had a chance to settle. However, it will be appreciated that the cleaning performed by the robot 102 may also involve removal of secondary colonizers and any subsequent colonizers.

As shown in FIG. 1 a computing device 106 may be provided in a deckhouse (or other area) of the vessel for communication with the robot 102.

Whilst FIG. 1 illustrates a single robot 102 on the vessel for simplicity, it will be appreciated that there may be multiple robots on the vessel. Similarly, whilst a single robot station 104 is shown in FIG. 1, it will be appreciated that there may be multiple robot stations on the vessel.

Robot

Figure 2:
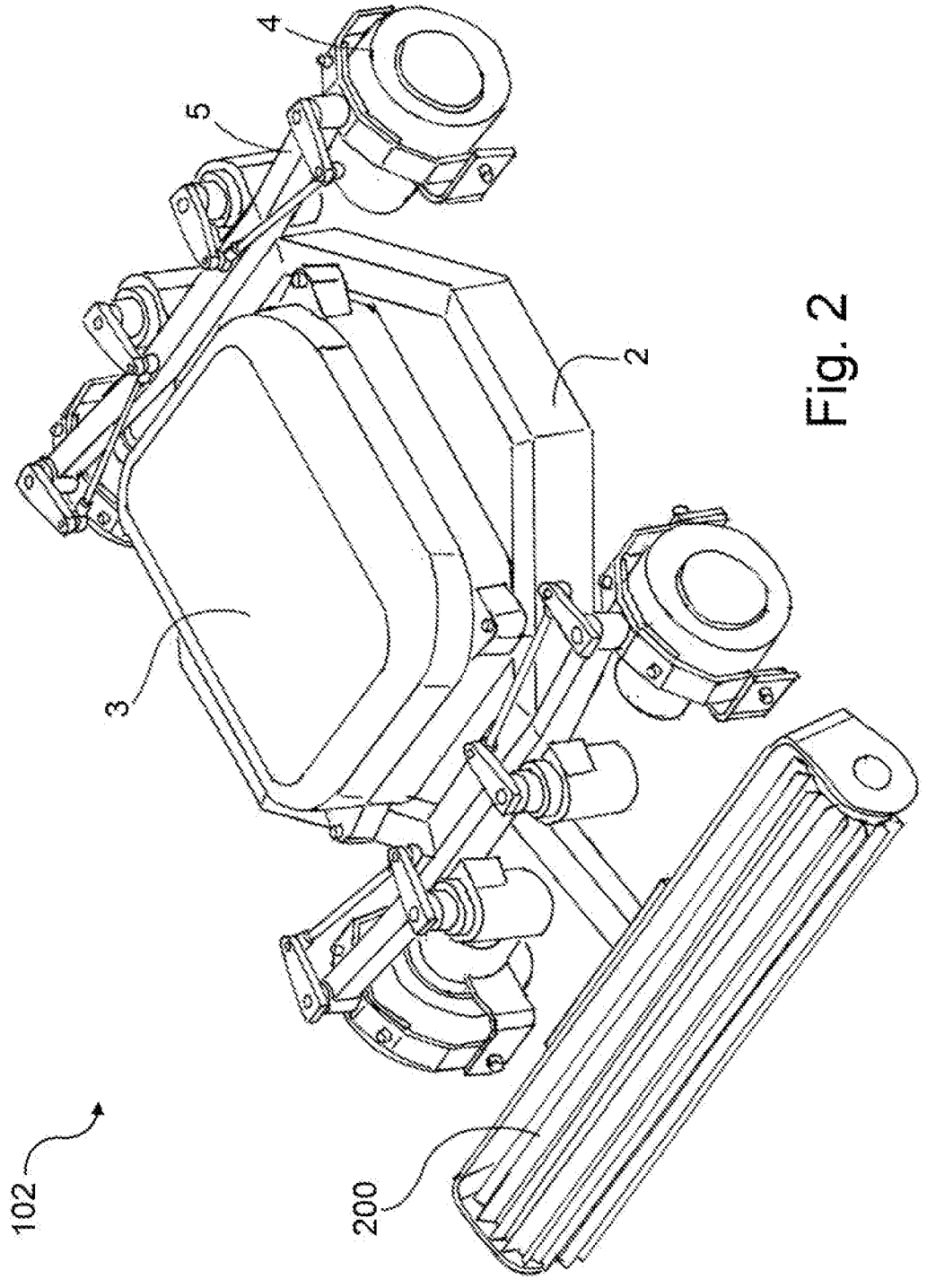
FIG. 2 illustrates an example hull cleaning robot.

FIG. 2 illustrates an example robot 102 for cleaning the hull of a marine vessel. The wheels 4 of the robot are magnetic, in order to adhere to ferrous hulls. The robot 102 is driven by the wheels 4, and the wheels 4 are driven by electric motors (not shown). In FIG. 2, the robot 102 is shown fully assembled in a perspective view. The chassis 2 of the robot 1 is a perimeter frame that holds a sealed container 3 that encloses a power supply (e.g. batteries) and may include one or more of the electrical components shown in FIG. 3. Whilst a single sealed container 3 is shown in FIG. 2 for simplicity, it will be appreciated that the robot 102 may comprise more than one sealed container. The container 3 is waterproof and sealed to prevent water ingress. The robot 102 shown in FIG. 2 comprises two beam "axles" 5 which are fixed to the chassis 2 and these beams 5 support the wheels 4 as well as associated elements of the suspension arrangement and steering mechanisms for the wheels 4. This axle arrangement is merely an example, and the mechanism by which the wheels are mounted to the chassis can take various forms that is outside the scope of the present disclosure. The robot 102 includes a cleaning brush assembly 200 which comprises a cleaning brush and a mechanism for coupling the cleaning brush to the robot 102, the cleaning brush assembly 200 may take various forms described in more detail below.

It will be appreciated that FIG. 2 shows just one example form that the robot 102 may take and other examples are possible.

Figure 3:
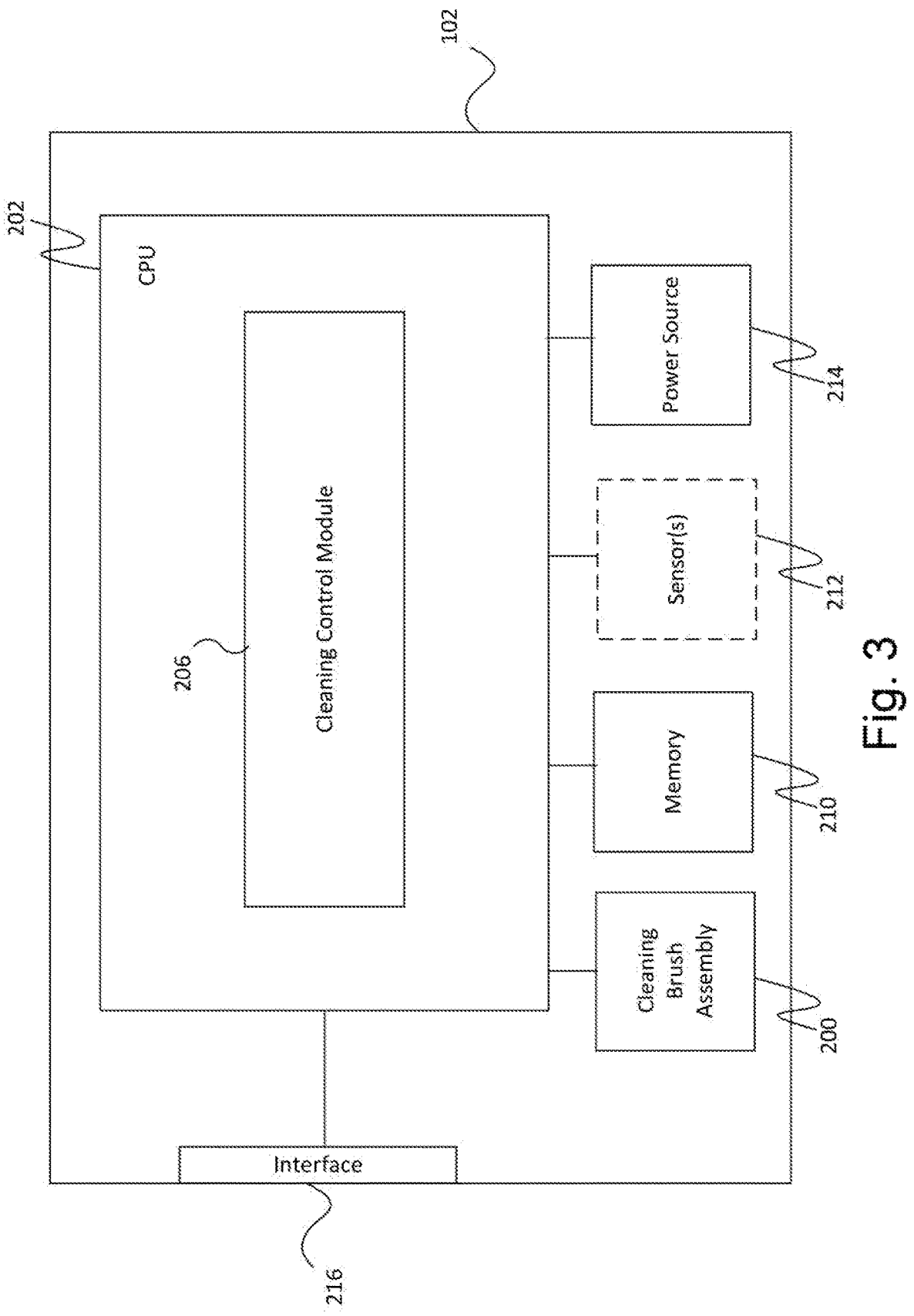
FIG. 3 is a schematic block diagram of the robot.

FIG. 3 is a schematic block diagram of the robot 102. As shown in FIG. 3, the robot 102 comprises a central processing unit ("CPU") 202. The CPU 202 comprises a cleaning control module 206 which is configured to control the cleaning brush of the cleaning brush assembly 200 which is coupled to the CPU 202 and performs the removal of fouling organisms from the surface of the hull 101.

The CPU 202 is coupled to a power source 214 (e.g. one or more battery). The power source 214 may be rechargeable e.g. using the robot station 104. The robot 102 also comprises a memory 210 for storing data as is known in the art.

In some embodiments an interface 216 is provided to enable the robot 102 to receive and transmit data. The interface 216 may comprise a wired and/or a wireless interface.

As shown in FIG. 3, the robot 102 may comprise one or more sensor 212 that is configured to output a sensor signal. One or more of the sensor(s) 212 may output the sensor signal to the cleaning control module 206. Additionally, or alternatively, one or more of the sensor(s) 212 may output the sensor signal to the computing device 106 via an interface 216.

The sensor(s) 212 may comprise a fouling sensor for sensing the degree of fouling on the hull 101.

The fouling sensor may be an electrical current sensor configured to measure the electrical current drawn by the motor driving the rotating cleaning brush 208 during cleaning, and the CPU 202 can correlate the measured current that is drawn by the motor to level of torque to the degree of fouling on the hull 101. It will be appreciated that the CPU 202 may perform the sensing of the electrical current drawn by the motor rather than a dedicated electrical current sensor.

The fouling sensor may be one or several cameras configured to output a camera signal comprising image data. The image data may be output to the CPU 202 which can perform image processing on the image data to detect the degree of fouling on the hull 101. Additionally or alternatively, the image data may be output via interface 216 to computing device 106. This allows a user of the computing device 106 to evaluate images captured by the camera(s) of the robot 102. In these embodiments, the computing device 206 may communicate the degree of fouling on the coated surface to the robot 102 and rely on the CPU 202 to determine that the robot requires reconfiguring based on a degree of fouling on the coated surface. Alternatively, based on the user's evaluation of the captured images, the user may control the computing device 206 to transmit a message to the robot 102 indicating that the robot requires reconfiguring based on the degree of fouling on the coated surface.

The fouling sensor may be a chlorophyll sensor on the robot configured to sense an amount of chlorophyll in an aquatic environment of the vessel, and the CPU 202 can correlate the amount of chlorophyll to the degree of fouling on the hull 101.

Additionally or alternatively, a fouling sensor may be located on the vessel 100. The fouling sensor(s) that are located on the vessel 100 may output sensor data directly to the CPU 202 on the robot 102 via interface 216. Alternatively, the fouling sensor(s) that are located on the vessel 100 may output sensor data to the computing device 106 which relays the sensor data (in raw or processed form) to the robot 102 via interface 216.

The sensor(s) 212 may comprise a location sensor configured to sense a location of the robot 102 on the vessel 100. The location sensor may be configured to detect a signal emitted from a beacon located on the vessel and the CPU 202 can correlate the detected signal with a position on the vessel associated with the beacon.

Additionally or alternatively, a location sensor for detecting the location of the robot 102 may be on the vessel 100. In these embodiments the location sensor may detect that the robot 102 is within its range and transmit a message to the robot 102 indicating a position on the vessel associated with the beacon.

The sensor(s) that are located on the vessel 100 may output the message directly to the CPU 202 on the robot 102 via interface 216. Alternatively, the sensor(s) that are located on the vessel 100 may output the message to the computing device 106 which relays the message to the robot 102 via interface 216.

Whilst FIG. 1 illustrates shows the computing device 106 as being on the vessel 100 this is merely an example and the computer device 106 (and the user of the computer device 106) may be on shore (i.e. on land). In these embodiments, the computing device 106 is in wireless communication with the robot 102. That is, the robot 102 may be remotely operated by a user on land.

Depending on the class of coating that is applied to the hull 101 of the vessel 100 the cleaning brush of the cleaning brush assembly 200 may take a form which has been identified as providing an optimal trade-off between cleaning performance and abrasiveness (to retain the coating's integrity).

In some embodiments, the cleaning brush of the cleaning brush assembly 200 is a lamellar brush 400. The lamellar type of brushes are typically designed as an elastic polymer mat 402 that is fastened to a core cylinder 404 as illustrated in FIG. 4. Examples of polymer mat material are polyvinyl chloride (PVC), polypropylene (PP), polyvinyl acetate (PVA) and polyamide (PA). Whilst FIG. 4 shows the lamellar brush 400 being formed from one or more polymer mats being fastened to the cylindrical core 404, it will be appreciated that the polymer mat 402 and cylindrical core 404 may be moulded as a single unit. The lamellar brush 400 comprises a plurality of lamellas 403 (e.g. fins) that extend across the length, L, of the cylindrical core 404. The height of the lamellas 403 define the extent at which the lamellas 403 extend outwardly from the cylindrical core 404. The lamellas 403 can be designed in various ways. For example, each lamella strip 403 may consist of a number of lamellas with various lengths, e.g. several lamella of 2-3 cm lengths. In addition, these lamellas may be staggered and not aligned to ensure full coverage of lamellas on the coating surface along the length, L of the lamellar brush 400. Alternatively or additionally, in between main lamellas extending across the cylindrical core 404, narrower lamellas perpendicular to the main lamellas may be provided.

The robot 102 is able to control the lamellar brush 400 to be at an initial position at which the plurality of lamellas 403 are in contact with, but not deformed by, the surface of the coating. During cleaning, the robot is configured to apply a degree of compression of the lamellar cleaning brush on the surface of a coating applied to the hull of the vessel such that the lamellar cleaning brush 400 is held in a position a distance, towards the surface of the coating, away from the initial position. In embodiments, this distance is selected as a percentage of the height of the plurality of lamellas 403 to optimise cleaning of a particular class of coating. Results of testing are presented below (in Tables 11a, 11b, 12, 13, 14, 15, 16) which include this "Compression (%)" parameter. For completeness, where appropriate the degree of compression is also expressed as a distance in mm based on the particular lamellar height/bristle length used on the cleaning brush during testing.

In other embodiments, the cleaning brush is a bristle brush. A bristle brush can have many designs, e.g. a tufted roller brush or strip roller brush.

An example tufted roller brush 500 is illustrated in FIGS. 5a and 5b. On the tufted roller brush 500 the bristles 502 of the cleaning brush are arranged in a plurality of tufts mounted to a core 504 of the cleaning brush. The tufts can be aligned or staggered. The material of the bristles 502 is typically polyamides e.g. polyamide 6.12 and 6.6, Rilsan polyamide 11; polyester e.g. poly(butylenetereftalat), (PBT); polypropylene or polyethylene. The material of the brush core 504 can be made of various materials such as aluminum, steel or a polymer material. It will be appreciated that these materials are provided merely as examples.

The stiffness of the brush is determined by the material, length and diameter of bristles.

Shorter length and larger diameter of the bristles gives a tougher and stiffer brush. Brush stiffness is also a function of how the bristles are assembled together in tuffs and how the tuffs are assembled on a brush core or support (geometry and tuff density). The bristle diameters are typically 0.2-2.0 mm. The bristles of the tufted roller brush 500 all have a bristle length, BL, which is typically selected as having a value between 15-50 mm.

The bristles can be assembled in many ways to make different vertical brush designs, e.g. to make a tufted roller brush 500 an example of which is illustrated in FIGS. 5a and 5b. The tufts can be positioned on a straight line along the length of the brush as illustrated in FIG. 5a or 5b, or can be positioned in various patterns along the brush, e.g. forming spiral shapes similar to the strip roller brush illustrated in FIG. 6c.

The robot 102 is able to control the tufted roller brush 500 to be at an initial position at which the bristles are in contact with, but not deformed by, the surface of the coating. During cleaning, the robot is configured to apply a degree of compression of the tufted roller brush 500 on the surface of a coating applied to the hull of the vessel such that the tufted roller brush 500 is held in a position a distance, towards the surface of the coating, away from the initial position. In embodiments, this distance is selected as a percentage of the bristle length of the bristles to optimise cleaning of a particular class of coating. Results of testing are presented below (in Tables 11a, 11b, 12, 13, 14, 15, 16) which include this "Compression (%)" parameter. For completeness, where appropriate the degree of compression is also expressed as a distance in mm based on the particular lamellar height/ bristle length used on the cleaning brush during testing.

Figure 6A:
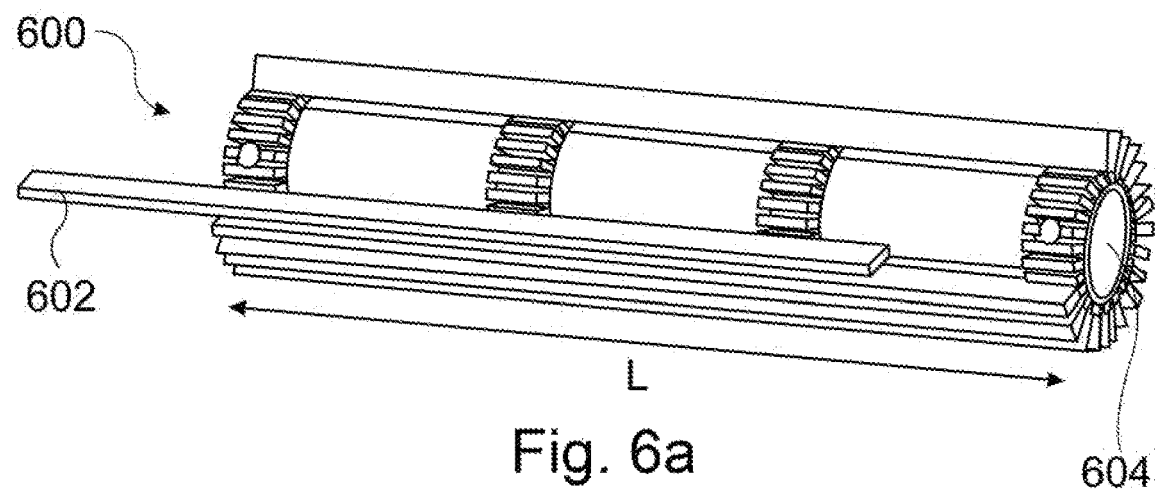
FIG. 6*a* illustrates a strip roller brush.

The bristles can also be arranged into a strip roller brush 600 as shown in FIG. 6a. On a strip roller brush 600 the bristles of the cleaning brush are arranged in a plurality of brush strips 602. The plurality of brush strips are mounted to a core 604 of the cleaning brush. The bristles of the brush strips 602 may be made from a brush material referred to above with respect to the tufted roller brush 500. The core of the strip roller brush 600 may be made from a material referred to above with respect to the tufted roller brush 500.

Figure 6B:
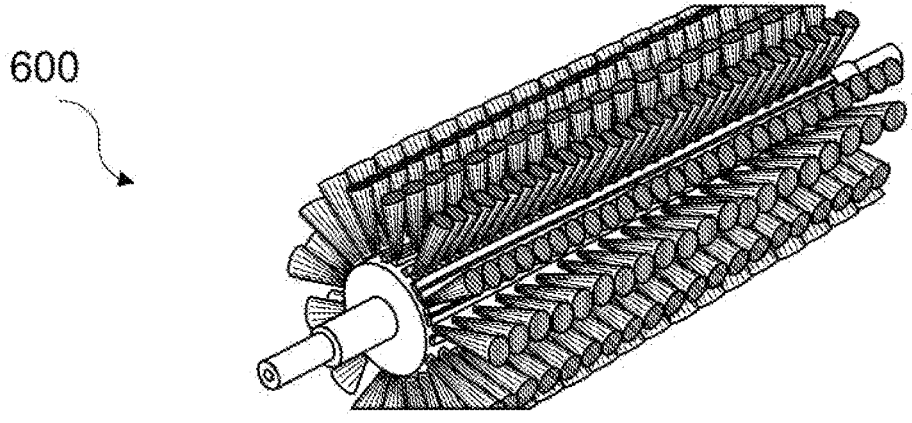
FIG. 6*b* illustrates a strip roller brush having straight brush strips.
Figure 6C:
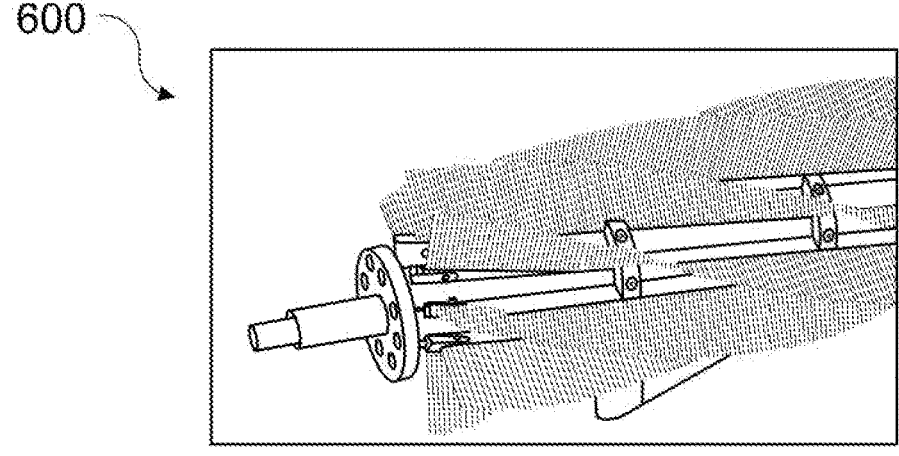
FIG. 6*c* illustrates a strip roller brush having spiral brush strips.

The plurality of brush strips of the strip roller brush 600 may be removable allowing for an easy change of the different brush strips 602. The abrasiveness and efficiency of the brush can easily be altered by changing the type of brush strip, changing the width of the brush strips and the number of strips. It also allows for different brush strips on the same brush. The brush strips can be straight (as illustrated in FIG. 6b) or with a spiral shape (as illustrated in FIG. 6c).

The robot 102 is able to control the strip roller brush 600 to be at an initial position at which the bristles are in contact with, but not deformed by, the surface of the coating.

During cleaning, the robot is configured to apply a degree of compression of the strip roller brush 600 on the surface of a coating applied to the hull of the vessel such that the strip roller brush 600 is held in a position a distance, towards the surface of the coating, away from the initial position. In embodiments, this distance is selected as a percentage of the bristle length of the bristles to optimise cleaning of a particular class of coating. Results of testing are presented below (in Tables 11a, 11b, 12, 13, 14, 15, 16) which include this "Compression (%)" parameter. For completeness, where appropriate the degree of compression is also expressed as a distance in mm based on the particular lamellar height/bristle length used on the cleaning brush during testing.

One or several brush strips of the strip roller brush 600 can be replaced by a scraper (e.g. formed from a solid strip of material). The scraper may be made from a thermoplastic material with varying hardness and flexibility. If all the brush strips are replaced by one scraper, it can be moved away from the surface by rotating the brush or it can be pressed against the surface by rotating the brush up to a given torque.

For all of the brush types described above, the brush cylindrical core may be split into two or more cylinders to achieve better cleaning ability on curvatures. Furthermore, for all of the brush types described above, whilst the brush core has been described as being cylindrical this is merely an example and embodiments extend to other shaped brush cores.

Whilst the particular arrangement of the cleaning brush assembly 200 is outside the scope of the present disclosure, for completeness we describe below an example form that the cleaning brush assembly 200 may take.

Figure 7A:
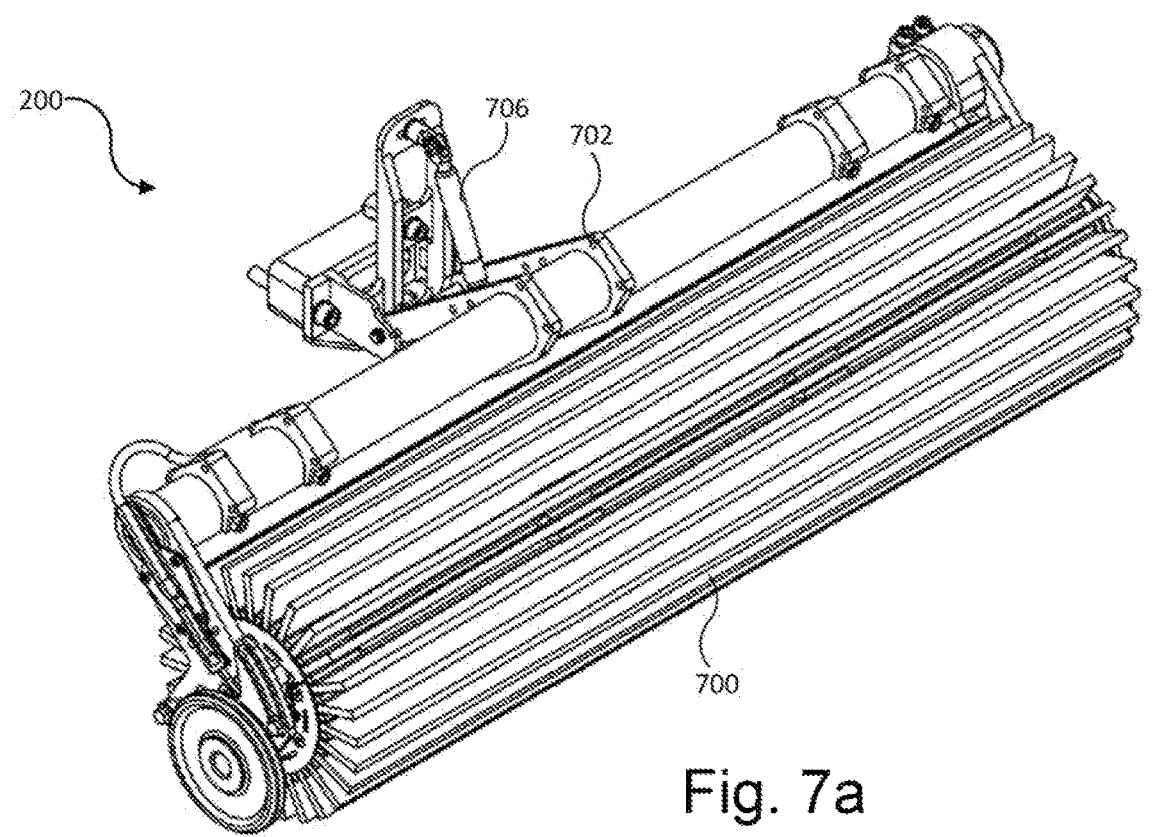
FIG. 7*a* illustrates an example cleaning brush assembly of the robot.

As illustrated in FIG. 7a, the cleaning brush assembly 200 comprises a brush arm 702. The cylindrical rotating brush 700 is connected at both ends to the robot via the brush arm 702.

Figure 7B:
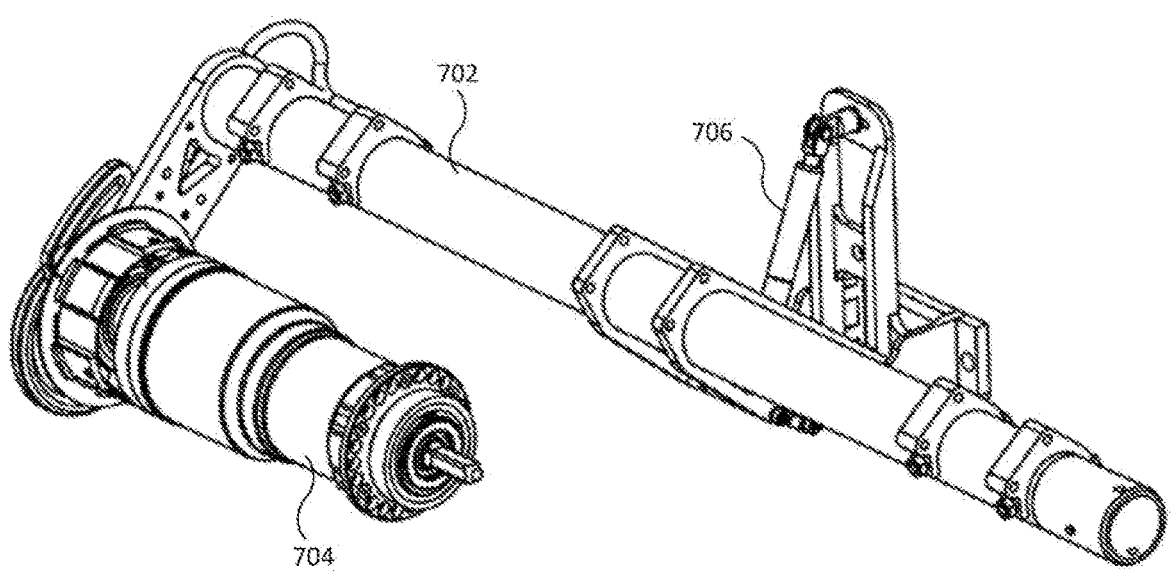
FIG. 7*b* illustrates a brush motor of the cleaning brush assembly.

As illustrated in FIG. 7b, a brush motor 704 is connected to one end of the brush arm 702. The brush motor 704 may be positioned inside the brush cylinder (e.g. if this is hollow) or outside the brush cylinder.

The brush motor 704 may be able to rotate the brush 700 in one or in both directions, enabling brush rotation with or against the robot running direction, both when it is running forward and backward. A typical rpm range for the brush rotation is 0-300 rpm.

The brush compression on the coated surface will also affect the brush abrasiveness and cleaning ability.

In one embodiment, the brush 700 is held in contact with the coated surface of the hull by at least one gas spring 706 on the brush arm as illustrated in FIGS. 7a and 7b.

As noted above, during cleaning the robot is configured to apply a degree of compression of the cleaning brush on the surface of a coating applied to the hull of the vessel such that the cleaning brush is deformed.

Based on a cleaning brush having bristles of a particular bristle length, BL, the degree of compression applied by cleaning brush can be defined as a distance (e.g. in mm) that the cleaning brush is moved (e.g. in a perpendicular direction) towards the surface of the coating from an initial position at which the cleaning brush is in contact with, but not deformed by, the surface of the coated surface of the hull. During cleaning the cleaning brush is held in a position that is this distance away from the initial position.

Figure 8A:
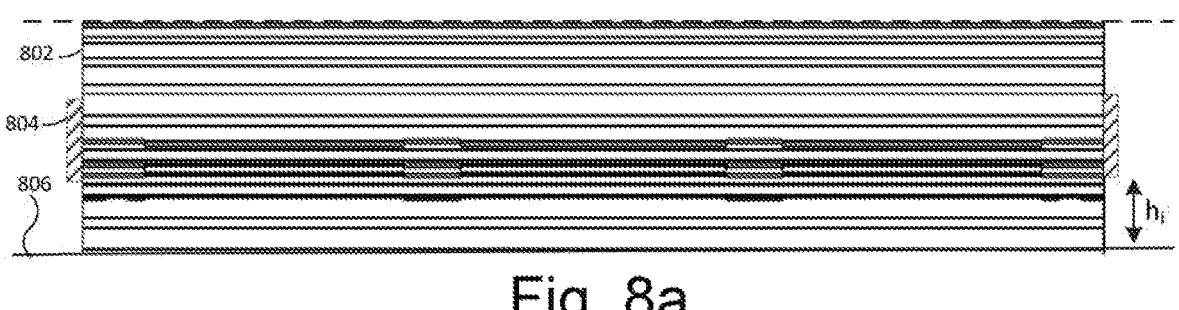
FIGS. 8*a-c* illustrate varying degrees of compression applied by a cleaning brush of the hull cleaning robot.

FIG. 8a illustrates a scenario whereby no compression is applied by the brush on a coated surface. As illustrated, the cleaning brush having a brush core 804 and bristles 802 is positioned such that ends of the brushes 802 are just in contact with the coated surface 806. That is, the brushes 802 having a height $h_i$ are in contact with, but not deformed by, the coated surface 806.

Figure 8B:
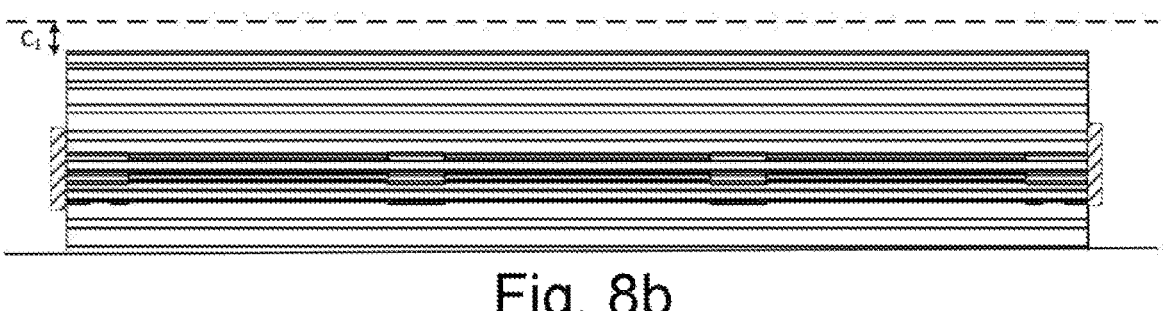

FIG. 8b illustrates a scenario whereby a first level of compression is applied by the brush on a coated surface. As illustrated, the cleaning brush is moved a distance C1 towards the coated surface 806 (and held in this position) which causes the bristles 802 in contact with the coated surface 806 to deform. As noted above the distance C1 can be defined as a percentage of the lamellar height/bristle length of the cleaning brush.

Figure 8C:
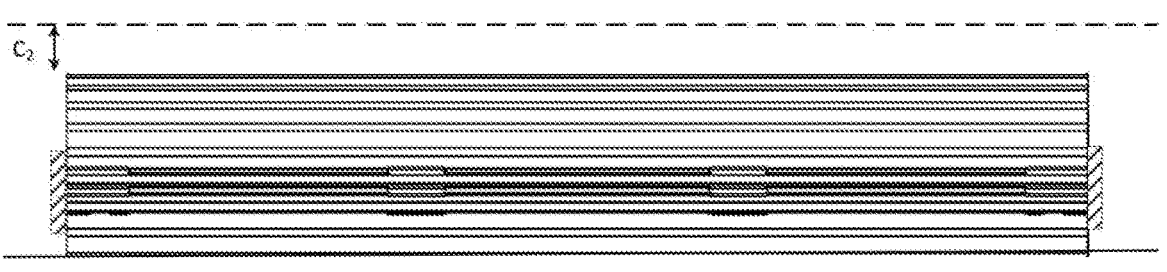

FIG. 8c illustrates a scenario whereby a second level of compression (greater than the first level of compression) is applied by the brush on a coated surface. As illustrated, the cleaning brush is moved a distance C2 (whereby C2>C1) towards the coated surface 806 (and held in this position) which causes the bristles 802 in contact with the coated surface 806 to deform. As noted above the distance C1 can be defined as a percentage of the lamellar height/bristle length of the cleaning brush.

The cleaning brush assembly 200 comprises a brush position adjustment mechanism for controlling the degree of compression.

The brush position adjustment mechanism may be manually adjustable (by a user) to control the degree of compression. Alternatively or additionally, the brush position adjustment mechanism is coupled to the processor 202, wherein the cleaning control module 206 is configured to communicate with the brush position adjustment mechanism to electronically control the degree of compression.

As a mere example we refer to a manually adjustable brush position adjustment mechanism below.

Figure 9A:
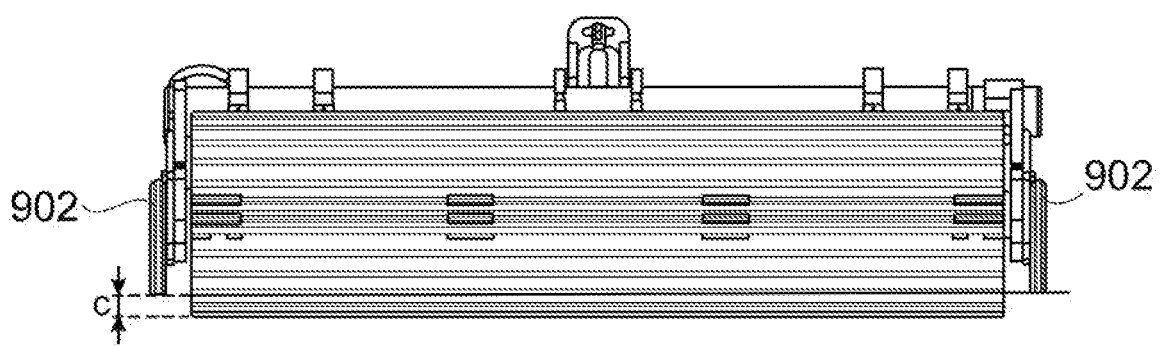
FIGS. 9*a* and 9*b* illustrate distance wheels of an example cleaning brush assembly.

The degree of compression of the brush on the surface may be controlled by two distance wheels 902 positioned on the outside edges of the brush cylinder as shown in FIG. 9a. The gas spring(s) 706 compresses the brush until the distance wheels touch the coated surface of the hull. In the example shown in FIG. 9a, the degree of compression C corresponds to the distance between the bottom of the distance wheel and the end of the brush bristles as indicated.

Figure 9B:
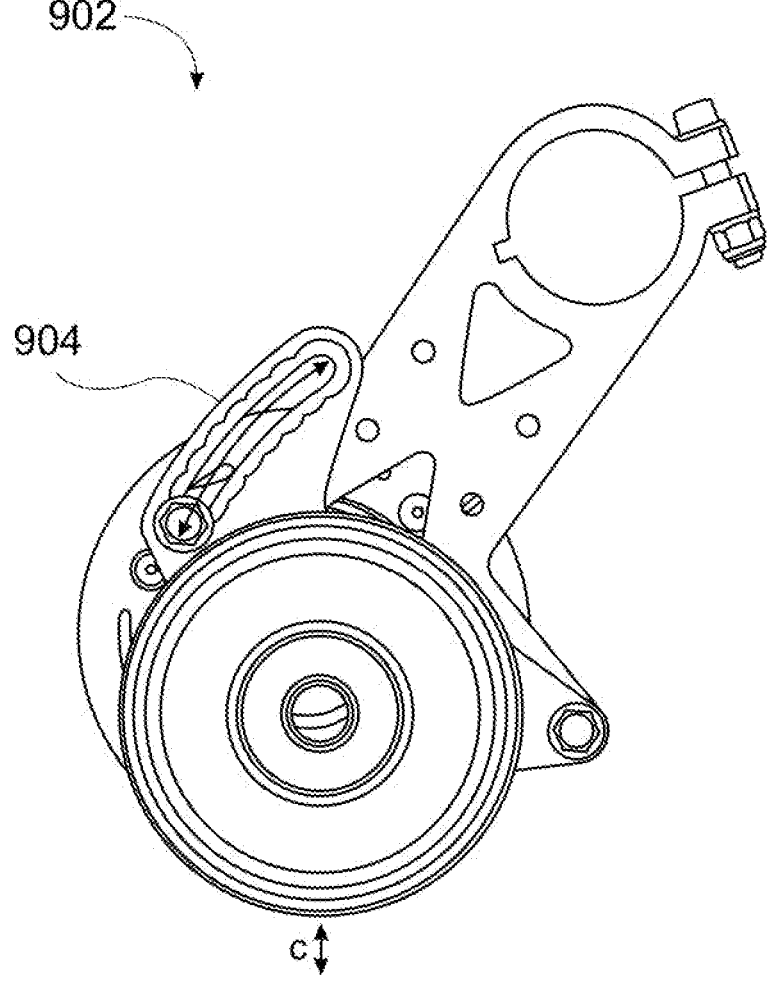

The position of the distance wheel and thereby the brush compression is adjusted by a position adjustment mechanism 904 shown in FIG. 9b. The position adjustment mechanism 904 has several positions giving adjustable compression of the brush and thereby adjustable force and abrasiveness of the brush on the coated surface. The number of distance positions can be varied. In the example shown in FIG. 9b, the degree of compression C corresponds to the distance between the bottom of the distance wheel and the end of the brush bristles as indicated. The wheel can also be replaced by interchangeable stationary distance pieces.

Figure 10A:
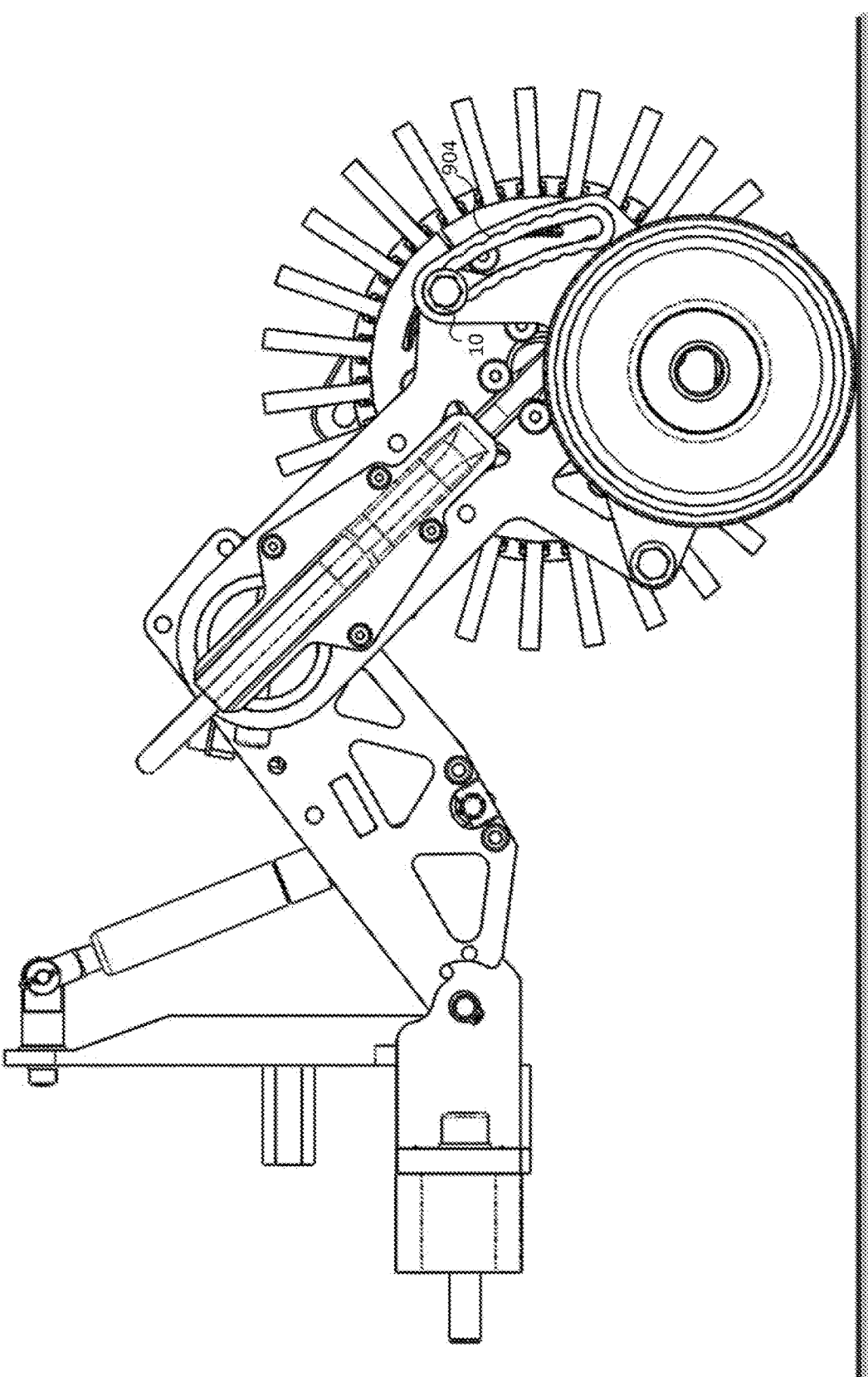
FIGS. 10*a-c* show a side view of the example cleaning brush assembly.

FIG. 10a shows a side view of the cleaning brush assembly 200 whereby a screw 10 of the position adjustment mechanism 904 is in a first position such that no compression is applied by the brush on the coated surface of the hull.

Figure 10B:
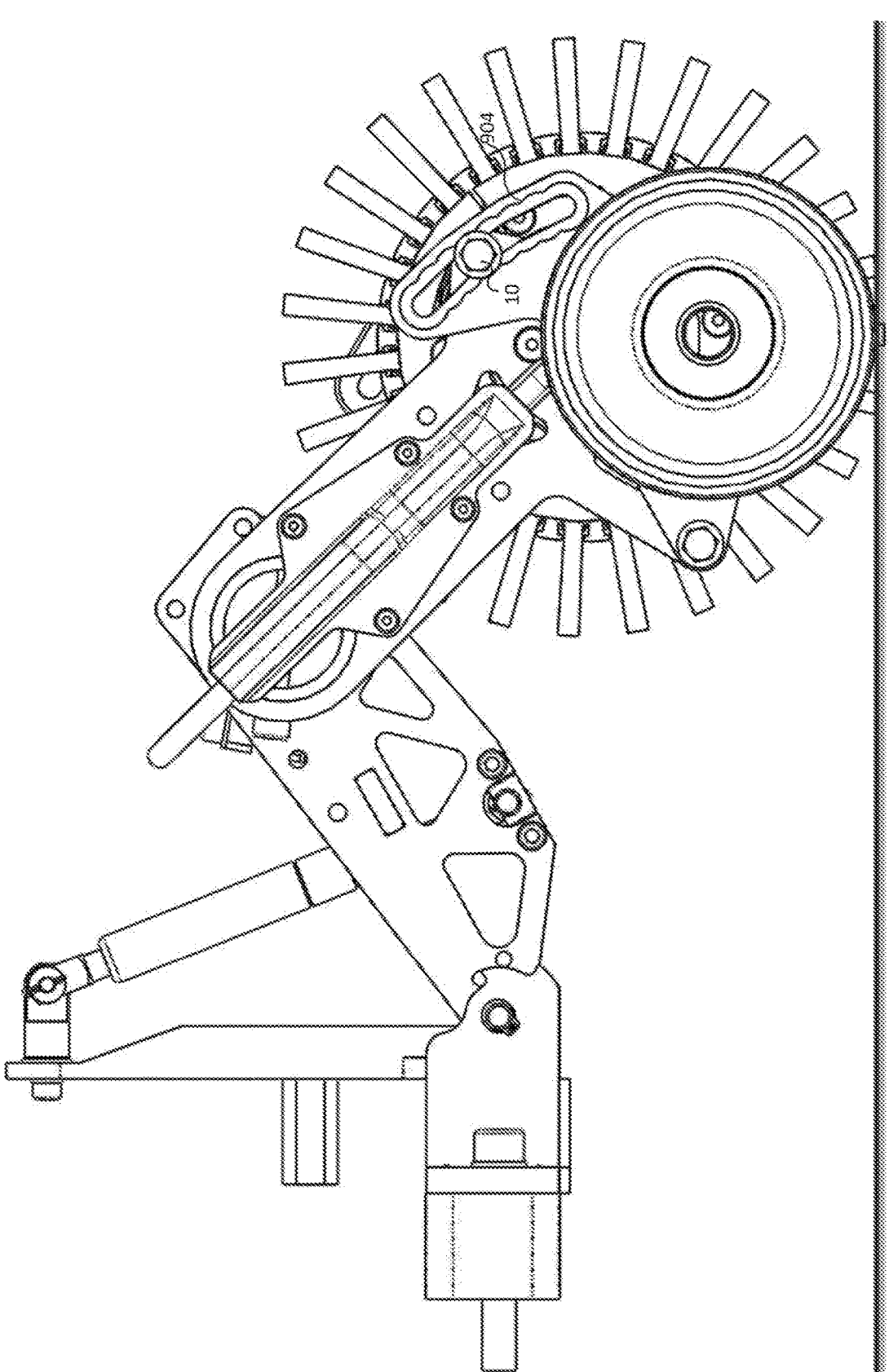

FIG. 10b shows a side view of the cleaning brush assembly 200 whereby the screw 10 of the position adjustment mechanism 904 is in a second position such that weak compression is applied by the brush on the coated surface of the hull. It will be appreciated that the portion of the bristles of the brush under the line (representing the coated surface of the hull) indicates that bristles will be bent/compressed when contacting the surface during rotation of the brush.

Figure 10C:
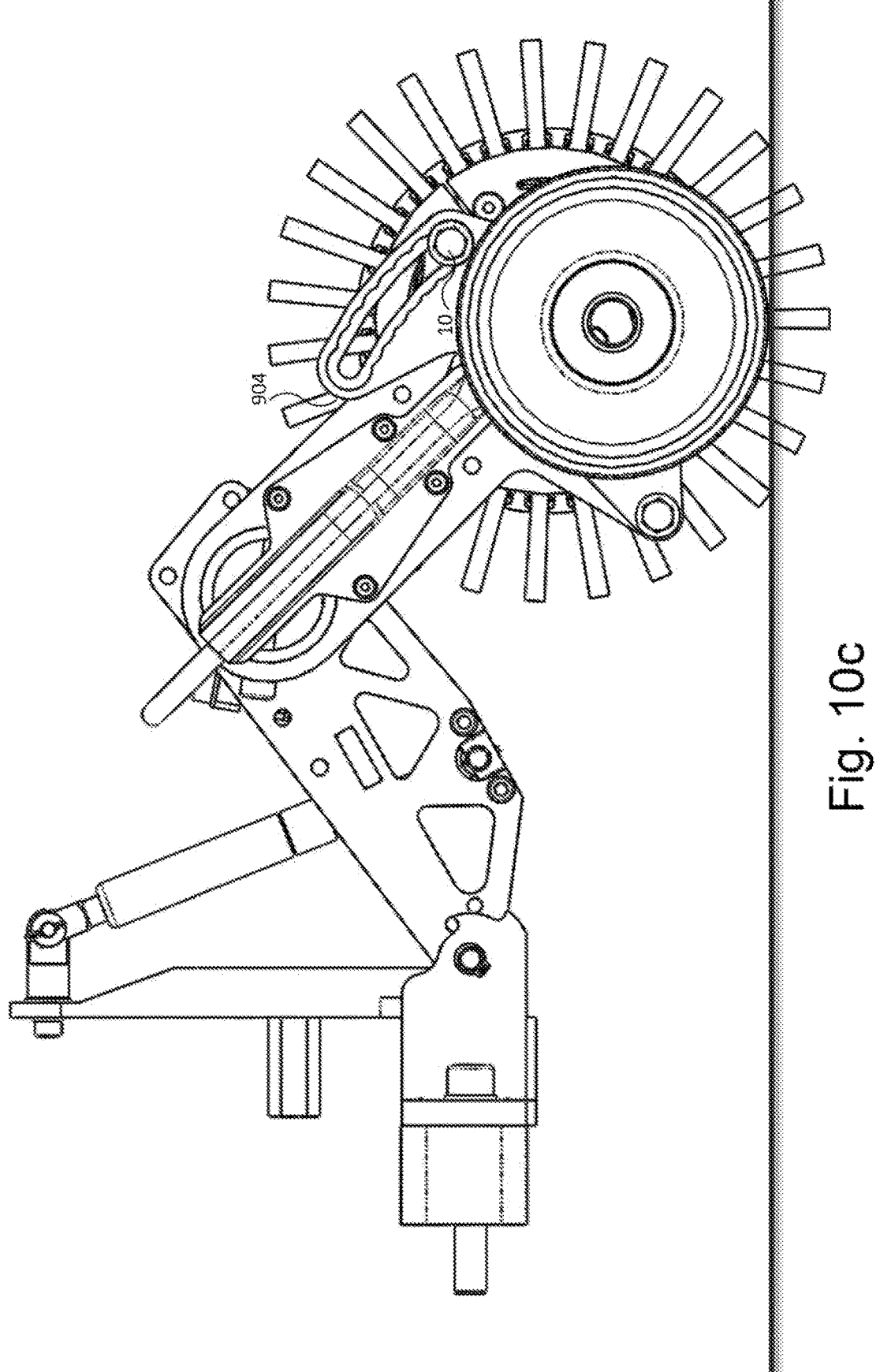

FIG. 10c shows a side view of the cleaning brush assembly 200 whereby the screw 10 of the position adjustment mechanism 904 is in a third position such that maximum compression is applied by the brush on the coated surface of the hull. Again, it will be appreciated that the portion of the bristles of the brush under the line (representing the coated surface of the hull) indicates that bristles will be bent/compressed when contacting the surface during rotation of the brush.

Coatings

The hull 101 of the vessel 100 to be cleaned by the robot 102 of the present invention is coated. It is important that the cleaning does not damage this coating, because oftentimes the coating comprises one or more antifouling agents that the coating is designed to release according to a specific release profile. If the coating is damaged, too much antifouling agent may be released at the time any damage occurs which may cause environmental problems. Of course, damaging the coating also reduces the overall lifetime of the coating.

The coating present on the hull 101 of the vessel 100 to be cleaned by the robot 102 may comprise a single layer, several layers of the same coating or may be a multi-layered coating, i.e. a coating system. In a multi-layered coating, the first coat (sometimes referred to as the primer coating) is often an anticorrosion protection layer. The primer coating is optionally over coated by a link coat or tie-coat followed by one or more final coats or topcoats, with or without antifouling properties. In another type of multi-layered coating, the first (primer) coat may simply be over coated with a last coat or topcoat.

In the coatings cleaned by the robot 102 of the present invention, it is the topcoat, or final coating layer, that is in contact with the robot. It is therefore this topcoat that needs to be cleaned, without causing any damage thereto.

The hull 101 of the vessel 100 to be cleaned by the robot 102 of the present invention may be coated with a single coating or coating system across the entire hull. Alternatively, the hull 101 of the vessel 100 may comprise of a number of sections of different coatings, or coating systems, on different parts of the hull (e.g. flat bottom, side bottom, vessel fore parts, vessel aft parts, waterline or parts prone to damages). The sectioning of the coatings or coatings systems may be driven by the probability of damage from external impact, expected fouling intensity and/or by the frequency and impact of cleaning by the robot 102. The different coatings or coating systems present in different parts of the hull might be different types and/or different thicknesses. As explained in more detail below, the robot 102 can determine that the robot requires reconfiguring to modify how its cleaning is performed based on its location on the hull of the vessel. A map of different areas/zones of the hull of a vessel may be stored in memory 210 each associated with a set of cleaning parameters (e.g. brush type, bristle diameter, degree of compression, number of strokes with the brush per defined area etc.). This enables the robot 102 to retrieve the cleaning parameters associated with the robot's current location and reconfigure itself to optimise cleaning in its location.

The coating applied on the vessel to be cleaned by the robot can be divided in classes depending on their hardness. They can be classified as soft, medium or hard, depending on their König pendulum hardness of coating film. The König hardness is measured according to ISO 1522:2006 using a pendulum hardness tester, as described in detail in the examples herein. The coatings were classified according to the Table below.

| Pendulum hardness (count number) | Coating class |
|---|---|
| Below 30 | Soft |
| 30-74 | Medium hard |
| 75 and above | Hard |

For single layer coatings, the coating tested in the above test is the coating applied to the hull of the vessel. For multi-layer coatings, the coating tested is the coating applied as the top or last coat in the multi-layer coating.

The hardness of a coating is dependent on a number of variables including, for example, the type of binder(s) present in the coating composition, the curing agent and accelerators used, the curing conditions, the additive mix present, etc. Thus, a given binder can be used to produce coatings of different hardness.

Coatings may also be divided according to whether they are degradable or non-degradable. The coatings may be free from antifouling agents or may contain one or several antifouling agents for improved antifouling performance.

Degradable coatings are typically based on binder systems with various mechanisms for degradation. Most often the degradation is hydrolysis of bonds in the binder system resulting in increased water solubility and polishing of the coating. The hydrolysis can either be hydrolysis of pendant groups or side chains on the polymer backbone in the binder or hydrolysis of groups in the polymer backbone in the binder. The use of self-polishing antifouling coatings is well known in the industry and are the most used degradable coating category used for fouling protection.

The binder present in a self-polishing, degradable coating may, for example, comprise silyl (meth)acrylate copolymer, rosin based binder, (meth)acrylate binder, backbone degradable (meth)acrylate copolymer, metal (meth)acrylate binder, hybrids of silyl (meth)acrylate binder, (meth)acrylic hemiacetal ester copolymers, polyanhydride binder, polyoxalate binder, non-aqueous dispersion binder, zwitterionic binder, polyester binder, poly(ester-siloxane) binder, poly(esterether-siloxane) binder, or mixtures thereof.

Typical silyl (meth)acrylate copolymers and coatings comprising these are described in GB2558739, GB2559454, WO2019096926, GB2576431, WO2010071180, WO2013073580, WO2012026237, WO2005005516, WO2013000476, WO2012048712, WO2011118526, WO0077102, WO2019198706, WO03070832, EP2128208 and WO2019216413.

Typical silyl (meth)acrylate copolymers with siloxane moieties are described in WO2011046087.

Typical rosin based binders and coatings comprising these are described in WO2019096928, DE102018128725, DE102018128727 and WO9744401.

Typical (meth)acrylate binders and coatings comprising these are described in DE102018128725A1, DE102018128727A1, WO2019096928, WO2018086670 and WO9744401.

Typical metal (meth)acrylate binders are described in WO2019081495 and WO2011046086.

Typical hybrids of silyl (meth)acrylate binders are described in KR20140117986, WO2016063789, EP1323745, EP0714957, WO2017065172, JPH10168350A and WO2016066567.

Typical polyanhydride binders are described in WO2004096927.

Typical polyoxalate binders are described in WO2019081495 and WO2015114091.

Typical non-aqueous dispersion binders are described in WO2019081495.

Typical zwitterionic binders are described in WO2004018533 and WO2016066567.

Typical polyester binders are described in WO2019081495, EP1072625, WO2010073995 and US20150141562.

Typical poly(ester-siloxane) and poly(ester-ether-siloxane) binders are described in WO2017009297, WO2018134291 and WO2015082397.

Typical (meth)acrylate hemiacetal ester copolymer binders are described in WO2019179917, WO2016167360, EP0714957 and WO2017065172.

Typical backbone degradable (meth)acrylate copolymer binders are described in WO2015010390, WO2018188488, WO2018196401 and WO2018196542.

The binder present in a self-polishing, degradable coating may also comprise a mixture of different binders of the same type and/or binders of different types.

Degradable coatings optionally further comprise one or more of the following:

monocarboxylic acids and derivatives of monocarboxylic acids, such as isostearic acid, Versatic™ acid, naphthenic acid, trimethyl isobutenyl cyclohexene carboxylic acid and mixtures thereof;

hydrophilic copolymers, such as poly(N-vinyl pyrrolidone) copolymers and poly(ethylene glycol) copolymers;

vinyl ether polymers and copolymers, such as poly(methyl vinyl ether), poly(ethyl vinyl ether), poly(isobutyl vinyl ether), poly(vinyl chloride-co-isobutyl vinyl ether);

polymeric plasticizers from any of the polymer groups specified above. The term polymeric plasticizer refers to polymers having a glass transition temperature (Tg) below 25° C.; and/or other binder selected from dimerized and polymerized rosin, alkyd resins and modified alkyd resins, and hydrocarbon resin, such as hydrocarbon resin formed only from the polymerisation of at least one monomer selected from a C5 aliphatic monomer, a C9 aromatic monomer, an indene coumarone monomer, or a terpene or mixtures thereof.

Non-degradable coatings are typically cross linked, often low VOC coatings. The binder present in a non-degradable coating may, for example, comprise polysiloxane, a siloxane copolymer, silicone binders, an epoxy-based binder, epoxysiloxane or mixtures thereof.

Typical polysiloxane binders and coatings comprising these are described in WO2019101912, WO2011076856, WO2014117786, WO2016088694 and WO2013024106.

Typical siloxane copolymer binders are described in WO2012130861 and WO2013000479.

Typical epoxy-based binders and coatings comprising these are described in WO2018046702, WO2018210861, WO2009019296, WO2009141438, EP3431560 and WO2017140610.

Typical epoxysiloxane binders are described in US2009281207, WO2019205078 and EP1086974.

Other types of silicone binders are silicone resins typically denoted as MQ, DT, MDT, MTQ or QDT resins.

The coating applied on the vessel 100 to be cleaned by the robot 102 may alternatively be a riblet structured curable polysiloxane binder, preferably containing antifouling agent, as described in WO2019189412. Such coatings may be applied as a coating or as an adhesive foil.

Preferred non-degradable coatings optionally further comprise one or more of the following: curing agents and/or accelerators; reactive diluents; silanes; co-binders; hydrocarbon resins; and additive oils. Conventional materials may be used.

The coating applied on the vessel 100 to be cleaned by the robot 102 may alternatively be a riblet structured adhesive foil with a fouling release topcoat, for example, as described in WO2018100108.

The coating applied on the vessel 100 to be cleaned by the robot 102 may alternatively be a water-based coating. Such coatings are well known in the art.

The coating composition to be applied on the hull of the vessel 100 to be cleaned may optionally further comprise solvent, pigment, fillers and additives. Suitable solvents include aliphatic, cycloaliphatic and aromatic hydrocarbons, alcohols, ketones, esters, and mixtures of the above. Examples of pigments include black iron oxide, red iron oxide, yellow iron oxide, titanium dioxide, zinc oxide, carbon black, graphite, red molybdate, yellow molybdate, zinc sulfide, antimony oxide, sodium aluminium sulfosilicates, quinacridones, phthalocyanine blue, phthalocyanine green, indanthrone blue, cobalt aluminium oxide, carbazole-dioxazine, chromium oxide, isoindoline orange, bis-acetoaceto-tolidiole, benzimidazolone, quinaphthalone yellow, isoindoline yellow, tetrachloroisoindolinone, and quinophthalone yellow, metallic flake materials (e.g. aluminium flakes) or other so-called barrier pigments or anticorrosive pigments such as zinc dust or zinc alloys or other so-call lubricant pigments such as graphite, molybdenum disulfide, tungsten disulphide or boron nitride. Examples of fillers that can be used in the coating are zinc oxide, barium sulphate, calcium sulphate, calcium carbonate, silicas or silicates (such as talc, feldspar, and china clay) including pyrogenic silica, bentonite and other clays, and solid silicone resins, which are generally condensed branched polysiloxanes. The coating optionally comprises one or more additives selected from surfactants, wetting agents, thickeners, antisettling agents, and dyes.

The coatings may be applied to the hull of the vessel to be coated by any conventional method known in the art.

Antifouling Agents

The coating present on the hull 101 of the vessel 100 to be cleaned by the robot 102 of the invention optionally comprises one or several compounds capable of preventing settlement or growth of marine fouling on a surface. The terms antifouling agent, antifoulant, biocide, active compounds, toxicant are used in the industry to describe known compounds that act to prevent marine fouling on a surface. The antifouling agents are marine antifouling agents.

It is particularly important that coatings comprising antifouling agent are not damaged by cleaning robots. If damage occurs, then too much antifouling agent is likely to be released at the time of the damage, and this may cause environmental problems. The lifetime of the antifouling property of the coating would also be diminished.

The antifouling agent may be inorganic, organometallic or organic. Suitable antifouling agents are commercially available.

Examples of inorganic antifouling agents include copper and copper compounds such as copper oxides, e.g. cuprous oxide and cupric oxide, copper thiocyanate and copper sulfide, copper powder and copper flakes.

Examples of organometallic antifouling agents include zinc pyrithione, organocopper compounds such as copper pyrithione, copper acetate, copper naphthenate, oxine copper, copper nonylphenolsulfonate, copper bis(ethylenediamine)bis(dodecylbenzensulfonate) and copper bis(pentachlorophenolate); dithiocarbamate compounds such as zinc bis(dimethyldithiocarbamate) [ziram], zinc ethylenebis(dithiocarbamate) [zineb], manganese ethylenebis(dithiocarbamate) [maneb] and manganese ethylene bis(dithiocarbamate) complexed with zinc salt [mancozeb].

Examples of organic antifouling agents include heterocyclic compounds such as 2-(tert-butylamino)-4-(cyclopropylamino)-6-(methylthio)-1,3,5-triazine [cybutryne], 4,5-dichloro-2-n-octyl-4-isothiazolin-3-one [DCOIT], 1,2-benzisothiazolin-3-one, 2-(thiocyanatomethylthio)-1,3-benzothiazole [benthiazole] and 2,3,5,6-tetrachloro-4-(methylsulphonyl) pyridine; urea derivatives such as 3-(3, 4-dichlorophenyl)-1,1-dimethylurea [diuron]; amides and imides of carboxylic acids, sulphonic acids and sulphenic acids such as N-(dichlorofluoromethylthio)phthalimide, N-dichlorofluoromethylthio-N',N'-dimethyl-N-phenylsulf-amide [dichlofluanid], N-dichlorofluoromethylthio-N',N'-dimethyl-N-p-tolylsulfamide [tolylfluanid] and N-(2,4,6-trichlorophenyl)maleimide; other organic compounds such as pyridine triphenylborane [TPBP], amine triphenylborane, 3-iodo-2-propynyl N-butylcarbamate [iodocarb], 2,4,5,6-tetrachloroisophthalonitrile, p-((diiodomethyl)sulphonyl) toluene, 4-bromo-2-(4-chlorophenyl)-5-(trifluoromethyl)-1H-pyrrole-3-carbonitrile [tralopyril], 4-[1-(2,3-dimeth-ylphenyl)ethyl]-1H-imidazole [medetomidine] and quater-nary ammonium salts.

Other examples of antifouling agents include tetraal-kylphosphonium halogenides, guanidine derivatives such as dodecylguanidine monohydrochloride; macrocyclic lac-tones including avermectins and derivatives thereof such as ivermectine; spinosyns and derivatives such as spinosad; capsaicin and derivatives such as phenylcapsaicin; and

[dichlorofluanid], N-dichlorofluoromethylthio-N',N'-dim-ethyl-N-p-tolylsulfamide [tolylfluanid], triphenylborane pyridine [TPBP] and 4-bromo-2-(4-chlorophenyl)-5-(trif-luoromethyl)-1H-pyrrole-3-carbonitrile [tralopyril], 4-[1-(2, 3-dimethylphenyl)ethyl]-1H-imidazole [medetomidine] and phenylcapsaicin.

The most preferred antifouling agents are cuprous oxide, copper thiocyanate, zinc pyrithione, copper pyrithione, zinc ethylenebis(dithiocarbamate) [zineb], 4,5-dichloro-2-n-oc-tyl-4-isothiazolin-3-one [DCOIT], 4-bromo-2-(4-chlorophe-nyl)-5-(trifluoromethyl)-1H-pyrrole-3-carbonitrile [tralopy-ril] and 4-[1-(2,3-dimethylphenyl)ethyl]-1H-imidazole [medetomidine].

A mixture of antifouling agents can be used as is known in the art as different antifouling agents operate against different marine fouling organisms. Mixtures of antifouling agents are generally preferred.

Some antifouling agents may be encapsulated or adsorbed on an inert carrier or bonded to other materials for controlled release.

Fouling

The level of fouling present on the hull of a vessel may be quantified by fouling rate as defined by the US Navy, given in the Table below.

| Fouling rating | Description |
|---|---|
| Soft 0 | A clean, foul-free surface; red and/or black AF paint or a bare metal surface. |
| Soft 10 | Light shades of red and green (incipient slime). Bare metal and painted surfaces are visible beneath the fouling. |
| Soft 20 | Slime as dark green patches with yellow or brown coloured areas (advanced slime). Bare metal and painted surfaces may by obscured by the fouling. |
| Soft 30 | Grass as filaments up to 3 inches (76 mm) in length, projections up to 1/4 inch (6.4 mm) in height; or a flat network of filaments, green, yellow, or brown in colour; or soft non calcareous fouling such as sea cucumbers, sea grapes, or sea squirts projecting up to 1/4 inch (6.4 mm) in height. The fouling cannot be easily wiped off by hand. |
| Hard 40 | Calcareous fouling in the form of tubeworms less than 1/4 inch in diameter or height. |
| Hard 50 | Calcareous fouling in the form of barnacles less than 1/4 inch in diameter or height. |
| Hard 60 | Combination of tubeworms and barnacles, less than 1/4 inch (6.4 mm) in diameter or height. |
| Hard 70 | Combination of tubeworms and barnacles, greater than 1/4 inch in diameter or height. |
| Hard 80 | Tubeworms closely packed together and growing upright away from surface. Barnacles growing one on top of another, 1/4 inch or less in height. Calcareous shells appear clean or white in color. |
| Hard 90 | Dense growth of tubeworms with barnacles, 1/4 inch or greater in height; Calcareous shells brown in color (oysters and mussels); or with slime or grass overlay. |
| Composite 100 | All forms of fouling present, Soft and Hard, particularly soft sedentary animals without calcareous covering (tunicates) growing over various forms of hard growth. | enzymes such as oxidase, proteolytically, hemicellulolyti-cally, cellulolytically, lipolytically and amylolytically active enzymes. Copper based antifouling coatings contain inor-ganic copper biocides such as metallic copper, cuprous oxide, copper thiocyanate and the like to prevent hard fouling.

The cuprous oxide material has a typical particle diameter distribution of 0.1-70 μm and an average particle size ($d_{50}$) of 1-25 μm. The cuprous oxide material may contain a stabilizing agent to prevent surface oxidation and caking.

Antifouling coatings without inorganic copper antifouling agent typically use a series of organic antifouling agents such as 4-[1-(2,3-dimethylphenyl)ethyl]-1H-imidazole [me-detomidine] and 4-bromo-2-(4-chlorophenyl)-5-(trifluorom-ethyl)-1H-pyrrole-3-carbonitrile [tralopyril] to prevent hard fouling.

Preferred antifouling agents are cuprous oxide, copper thiocyanate, zinc pyrithione, copper pyrithione, zinc ethyl-enebis(dithiocarbamate) [zineb], 2-(tert-butylamino)-4-(cy-clopropylamino)-6-(methylthio)-1,3,5-triazine [cubutryne], 4,5-dichloro-2-n-octyl-4-isothiazolin-3-one [DCOIT], N-di-chlorofluoromethylthio-N',N'-dimethyl-N-phenylsulfamide Preferred robots and methods of the present invention maintain the fouling rate below Soft20 and more preferably below Soft10. This highlights the fact that the robots of the present invention are for proactive cleaning, i.e. cleaning to avoid the accumulation of fouling to the extent that it becomes difficult, or even impossible, to clean without causing damage to the coating.

The invention will now be described by the following non-limiting examples.

EXAMPLES

Materials

The coatings used in the examples are summarised in Table 1 below. They were prepared as set out under the table using polymers, synthesised by conventional methods, and commercially available starting materials. The components are given in parts by weight, pbw.

TABLE 1

| Coating | Class | Type | Pendulum Hardness (count number) |
|---|---|---|---|
| C1 | Soft | Polysiloxane | 8 |
| C2 | Medium | Silyl (meth)acrylate and rosin based binder system | 72 |
| C3 | Medium | Rosin and (meth)acrylate based binder system | 66 |
| C4 | Medium | (Meth)acrylate, silyl (meth)acrylate and rosin based binder system | 67 |
| C5 | Hard | Epoxysiloxane resin | 76 |
| C6 | Hard | Epoxy binder | 105 |
| C7 | Hard | Epoxy resin-epoxysiloxane resin hybrid | 118 |

Preparation of Coating Composition C1

The coating composition was prepared by first mixing the components in part (A) shown in Table 2 below using a high-speed dissolver equipped with an impeller disc. The non-ionic hydrophilic modified polysiloxane was added to the coating composition after the grinding phase. The components in part (B) were mixed with the components in part (A) shortly before application of the coating.

TABLE 2

| Components in part A | Composition (pbw) C1 |
|---|---|
| α,ω-Hydroxypolydimethylsiloxane binder (3500 mPas) | 58.00 |
| Hydrophobic silica | 0.50 |
| Iron oxide red | 3.50 |
| Methyl phenyl polysiloxane oil | 10.00 |
| Non-ionic hydrophilic modified polysiloxane | 5.00 |

TABLE 2-continued

| | |
|---|---|
| Xylene | 9.00 |
| 1-Methoxy-2-propanol | 14.10 |
| Total part A | 100 |
| Components in part B | |
| Ethyl silicate crosslinker | 4.20 |
| Dibutyltin diacetate | 0.20 |
| 1-Methoxy-2-propanol | 4.00 |
| Total part B | 8.40 |

Preparation of Coating Compositions C2-C4

The coating compositions were prepared by mixing the components shown in Table 3 using a high-speed dissolver equipped with an impeller disc.

TABLE 3

| | Composition (pbw) | | |
|---|---|---|---|
| Components | C2 | C3 | C4 |
| Silyl (meth)acrylate copolymer (Viscosity: 410 cP, Non-volatile content: 50.6 wt %, Mw: 37 600 g/mol, Tg: 42° C.)[1] | 23.00 | — | — |
| Silyl (meth)acrylate copolymer (Viscosity: 303 cP, Non-volatile content: 49.8 wt %, Mw: 45 800 g/mol, Tg: 42° C.)[2] | — | 10.00 | — |
| (Meth)acrylate copolymer (Viscosity: 470 cP, Non-volatile content: 50.4 wt % Mw: 21104 g/mol, Tg: 30° C.)[3] | — | 11.00 | 14.50 |
| (Meth)acrylate copolymer (Viscosity: 95 cP Non-volatile content: 50.1. wt % Mw: 28 651, Tg: −35° C.)[4] | — | 4.00 | 7.50 |
| Gum rosin solution (60 wt % in xylene) | 5.00 | 12.00 | 15.00 |
| Copper Pyrithione | 2.00 | 3.00 | 1.50 |
| Tetraethoxysilane | 0.50 | 0.50 | — |
| Polyamide wax (20% in xylene) | 1.00 | 1.00 | — |
| Oxidized polyethylene wax (25% in xylene) | 1.00 | — | — |
| Disperbyk 2070 | — | 0.50 | — |
| Anti Terra U | — | — | 1.00 |
| Cuprous oxide | 50.00 | 34.00 | 33.00 |
| Zineb | — | 5.00 | 5.00 |
| Zinc oxide | 4.50 | 1.50 | 9.00 |
| Iron oxide | 2.00 | 1.50 | 3.50 |
| Titanium dioxide | 1.00 | 2.50 | 2.50 |
| Dolomite | — | 8.50 | 2.00 |
| Microtalc | 4.50 | — | — |
| Aqualon N200 | — | — | 0.20 |
| Xylene | 5.50 | 5.00 | 5.30 |
| Sum | 100 | 100 | 100 |

[1]Reproduced polymer example S11 in GB2559454. Polymer properties measured as described in GB2559454.

TABLE 3-continued

[2] Reproduced polymer example S1 in WO2019096926. Polymer properties measured as described in WO2019096926.
[3] Reproduced polymer example P1 in DE102018 128727. Polymer properties measured as described in DE102018128727.
[4] Reproduced polymer example P3 in DE102018128725. Polymer properties measured as described in DE102018128725.

Preparation of Coating Compositions C5-C7

The coating compositions were prepared by mixing the components shown in Table 4 using a high-speed dissolver equipped with an impeller disc. The hydrophilic modified polysiloxane was added to the coating composition after the grinding phase. The components in part (B) were mixed with the components in part (A) shortly before application of the coating.

TABLE 4

| | Composition (pbw) | | |
|---|---|---|---|
| Components in part A | C5 | C6 | C7 |
| Liquid epoxy resin; viscosity 6-14000 cps at 25° C. | — | 45.00 | 34.00 |
| Epoxy siloxane resin; viscosity 1-2000 cps at 25° C. | 65.00 | — | 25.00 |
| Extenders | 16.00 | 40.50 | 23.60 |
| Hydrophobic fumed silica | 1.50 | — | 1.70 |
| Thixotropic agent | 2.50 | 1.40 | 1.80 |
| Iron oxide red | 5.00 | 3.50 | 4.40 |
| Reactive diluent | — | 7.00 | — |
| Epoxy functional silane | — | 1.50 | — |
| Hydrophilic modified polysiloxane | 5.00 | — | 6.00 |
| Benzyl alcohol | — | 0.40 | — |
| n-Butanol | — | 0.25 | 0.20 |
| Xylene | 5.00 | 0.50 | 3.30 |
| Total part A | 100 | 100 | 100 |
| Components in part B | C5 | C6 | C7 |
| Cycloaliphatic amine | — | 6.00 | 3.00 |
| Modified aliphatic amine | — | 4.00 | — |
| Modified polyamine | — | — | 14.00 |
| Aminosilane | 15.00 | — | 3.00 |
| Total part B | 15 | 10 | 20 |

Preparation of Test Panels for Static Fouling Exposure

PVC panels were coated with a coating system. For exposure in Sandefjord PVC panels with a size of 20×40 cm were used. For exposure in Singapore PVC panels with a size of 20×30 cm were used. The coating system comprised a first coat, a second coat and, for some, a third coat as shown below in Table 5. The application of the coatings was performed using airless spray, according to specifications given in the technical datasheets for the various coatings. The application of the coating compositions C1-C7 was performed using airless spray to the specified wet film thickness. The example coatings were applied to the wet film thicknesses (WFT) given in Table 5. The wet film thicknesses were measured using a wet film thickness gauge. The panels were dried for at least 1 week before immersion.

TABLE 5

| Coating | 1st coat | 2nd coat | 3rd coat |
|---|---|---|---|
| C1 | Jotun Jotacote Universal N10 primer | Jotun SeaQuest Tiecoat | Coating C1 WFT: 225 μm |

TABLE 5-continued

| Coating | 1st coat | 2nd coat | 3rd coat |
|---|---|---|---|
| C2 | Jotun Safeguard Universal ES Tiecoat | Coating C2 WFT: 320 μm | |
| C3 | Jotun Safeguard Universal ES Tiecoat | Coating C3 WFT: 300 μm | |
| C4 | Jotun Safeguard Universal ES Tiecoat | Coating C4 WFT: 300 μm | |
| C5 | Jotun Jotamastic 90 primer | Coating C5 WFT: 180 μm | |
| C6 | Jotun Jotamastic 90 primer | Coating C6 WFT:350 μm | |
| C7 | Jotun Jotamastic 90 primer | Coating C7 WFT: 380 μm | |

Preparation of Coating System for Vessels In-Service and Idle Vessel

The coating systems on vessels in service and idle vessels are given in Table 6 below. The C2 coating system comprised a first coat, a second coat, a third coat and a fourth coat as shown below in Table 6. The C5-C7 coating systems comprised a first coat and a second coat as shown below in Table 6. The application of the coatings was performed using airless spray, according to specifications given in the technical datasheets for the various coatings. The application of the coating compositions C2 and C5-C7 was performed using airless spray to the specified wet film thickness. The example coatings were applied to the wet film thicknesses (WFT) given in Table 6. The wet film thicknesses were measured using a wet film thickness gauge.

TABLE 6

| Coating | 1st coat | 2nd coat | 3rd coat | 4th coat |
|---|---|---|---|---|
| C2 | Jotun Jotamastic 90 primer | Jotun Safeguard Universal ES Tiecoat | Coating C2 WFT: 180-320 μm | Coating C2 WFT: 255-330 μm |
| C5 | Jotun Jotamastic 90 primer | Coating C5 WFT: 180 μm | | |
| C6 | Coating C6 WFT: 350 μm | Coating C6 WFT: 350 μm | | |
| C7 | Coating C6 WFT: 350 μm | Coating C7 WFT: 380 μm | | |

Robot

Tests were performed using a robot, an example of which is shown in FIG. 2 or a brush module (not illustrated in the figures) replicating the robot cleaning function. The brush module is designed to mimic the cleaning function of the robot, with the same materials and functionality. The unit is modular enabling testing with different brushes. It has adjustable rotational speed and compression of the brush towards the surface. The brush module is connected to a frame that is fastened to the hull of a vessel or to a mounting plate for test panels by magnetic feet. The module includes a brush motor for rotating the cylindrical brush in both directions and a motor for linear motion of the brush, moving the rotating brush over the surface of an underwater hull or test panels.

The different brush characteristics used in the robot and brush module are shown below in Table 7. For the lamellar brush used in brush 1A and 1B the lamella strip 403 consisted of a number of lamellas each with a length of 26 mm. The 26 mm lamellas were aligned as the lamella strip 403 across the brush core length L. The brush core length L was 106 mm for brush 1A and 900 mm for brush 1B.

TABLE 7

| Brush | Material | Geometry | Lamellar height/ Bristle length (mm) | Lamellar length/ Bristle tuft diameter (mm) | Lamellar thickness/ Bristle diameter (mm) |
|---|---|---|---|---|---|
| 1A | Soft polymeric material | Lamellar | 18 | 26 | 1 |
| 2A | Nylon | Tufted | 25 | 10 | 0.5 |
| 3A | Nylon | Tufted | 25 | 10 | 1.0 |
| 4A | Nylon | Tufted | 25 | 10 | 1.2 |
| 1B | Soft polymeric material | Lamellar | 18 | 26 | 1 |
| 2B | Polybutylene terephthalate | Strip roller | 37 | 5 | 0.5 |
| 3B | Polybutylene terephthalate | Strip roller | 37 | 5 | 1.0 |
| 4B | Polybutylene terephthalate | Strip roller | 37 | 5 | 1.2 |

Test Methods

Determination of König pendulum hardness of coating film

The hardness of the various coatings was measured according to ISO 1522:2006 using a pendulum hardness tester. Each of the coatings was applied to glass panels using a frame applicator with 300 µm gap size. The coatings were dried at 23° C. and 50% relative humidity for 1 week and then dried at 50° C. for 72 hours in a ventilated heating cabinet. The coatings were then conditioned at 23° C. and 50% relative humidity for 24 hours. After the conditioning, the coating hardness of the dry coating film was measured at a temperature of 23° C. and 50% relative humidity using a TOC sheen pendulum hardness tester. The hardness is quantified as the number of pendulum swings to damp the amplitude from 6° to 3° (each pendulum swing corresponds to one count). The hardness is reported as the average of three parallel measured count numbers on each coating film. The coatings were classified according to Table 8 below.

TABLE 8

| Pendulum hardness (count number) | Coating class |
|---|---|
| Below 30 | Soft |
| 30-74 | Medium hard |
| 75 and above | Hard |

Fouling exposure of test panels in Sandefjord (sea water)

PVC panels, coated with the coating systems, as given in Table 5 were exposed statically on a raft in Sandefjord where the panels were submerged 0.3-1.3 m below the sea surface. The exposure time for coating C1 to C4 was 13 weeks in the period mid-July to mid-October. The exposure time for coating C5 to C7 was 4 weeks in the period mid-July to mid-August. After completion of the exposure time the panels were evaluated by visual inspection reporting the fouling rate as defined by the US Navy, given in Table 9 below.

TABLE 10

| Fouling rating | Description |
|---|---|
| Soft 0 | A clean, foul-free surface; red and/or black AF paint or a bare metal surface. |
| Soft 10 | Light shades of red and green (incipient slime). Bare metal and painted surfaces are visible beneath the fouling. |
| Soft 20 | Slime as dark green patches with yellow or brown coloured areas (advanced slime). Bare metal and painted surfaces may by obscured by the fouling. |
| Soft 30 | Grass as filaments up to 3 inches (76 mm) in length, projections up to $\frac{1}{4}$ inch (6.4 mm) in height; or a flat network of filaments, green, yellow, or brown in colour; or soft non calcareous fouling such as sea cucumbers, sea grapes, or sea squirts projecting up to $\frac{1}{4}$ inch (6.4 mm) in height. The fouling cannot be easily wiped off by hand. |
| Hard 40 | Calcareous fouling in the form of tubeworms less than % inch in diameter or height. |
| Hard 50 | Calcareous fouling in the form of barnacles less than % inch in diameter or height. |
| Hard 60 | Combination of tubeworms and barnacles, less than % inch (6.4 mm) in diameter or height. |
| Hard 70 | Combination of tubeworms and barnacles, greater than % inch in diameter or height. |
| Hard 80 | Tubeworms closely packed together and g rowing upright away from surface. Barnacles growing one on top of another, % inch or less in height. Calcareous shells appear clean or white in color. |
| Hard 90 | Dense growth of tubeworms with barnacles, % inch or greater in height; Calcareous shells brown in color (oysters and mussels); or with slime or grass overlay. |
| Composite 100 | All forms of fouling present, Soft and Hard, particularly soft sedentary animals without calcareous covering (tunicates) growing over various forms of hard growth. |

Fouling exposure of test panels in Singapore (sea water)

PVC panels, coated with the coating systems C2, C5, C6 and C7 as described above, were exposed statically on a raft in Singapore where the panels were submerged 0.3-1.3 m below the sea surface. The exposure time for the coating C2 was 1, 2 and 4 weeks in October. The exposure time for the coatings C5, C6 and C7 was 1 and 2 weeks in the period mid to end October. After completion of the exposure time, the panels were evaluated by visual inspection reporting the fouling rate as defined by the US Navy, given in Table 9 above. Additionally, the maximum diameter in mm of barnacles attached was measured.

Abrasion resistance and cleaning ability

The abrasion resistance and the cleaning ability of the coatings was measured with different robot/module settings both on test panels, on vessels in-service and on an idle vessel. The vessels in service used for testing of abrasion resistance and cleaning ability included vessels with voyage factors ranging from 24 to 75%, effective operational speeds ranging from 11 to 19 knots and effective operational temperatures ranging from 20 to 26° C.

Abrasion Resistance on Test Panels with Brush Module

After fouling exposure as described above, the test panels were dismounted from the raft and transported in boxes filled with seawater to preserve the fouling on the panels and keep the panels in an immersed condition. Each panel was fastened to the mounting plate for testing of abrasion resistance by the brush module. The abrasion resistance was tested with different brushes and/or three different compressions as shown in the results Tables 11a, 11 b and 12 below.

The inventors identified that the impact of the robot 102 will depend on both the robot speed and the rpm of the cleaning brush of the robot. To take into account both of these factors, the inventors considered the number of strokes of the cleaning brush to a specified area of the test panels when the brush module travelled over the specified area in one pass.

In particular, for a lamellar cleaning brush 400 when the brush module travelled over the specified area in one pass, the number of brush strokes applied by each lamella was calculated based on the robot speed and the rpm of the lamellar cleaning brush.

For a tufted roller brush 500 when the brush module travelled over the specified area in one pass, the number of brush strokes applied by each tuft of bristles was calculated based on the robot speed and the rpm of the tufted roller brush.

For a strip roller brush 600 when the brush module travelled over the specified area in one pass, the number of brush strokes applied by each brush strip was calculated based on the robot speed and the rpm of the tufted roller brush.

The specified area of the test panels was defined as having dimensions of 5 mm×Lmm (whereby L denotes the length of the cleaning brush as shown for example in FIGS. 4 and 6a). In defining the specified area, 5 mm was chosen as the brush strip for one of the brushes had a diameter of 5 mm.

For the test panels exposed in Singapore the brush was run over the panels one time with a speed of 0.012 m/s and a rotational speed of the brush of 4 rpm. This corresponds to 6 strokes of each bristle tuft or each brush strip per the specified area of the test panel that is referred to above. For the test panels exposed in Sandefjord the brush was run at 90 rpm for 15, 30 and 60 seconds. This corresponds to 428, 855 and 1710 strokes of each lamella/bristle tuft/brush strip per the specified area that is referred to above.

The evaluation of abrasion resistance was performed both visually and by using an optical microscope. If the coating was heavily damaged or abraded so that it was clearly visible to the naked eye, no further evaluation was performed. If the abrasion was not clearly visible to the naked eye after the abrasion testing, a sample of each tested area of each paint film (still attached to the PVC) was cut out and embedded in epoxy resin. After curing, the samples were cut to expose the crosscut of the film, then polished so that a cross section of the coating film could be examined with an optical microscope. The detection of film removal was seen as the reduction in film thickness of the area exposed to operation by the brush, compared to the adjacent area not exposed to operation by the brush. All evaluations were made using a digital camera and calibrated software. The results are reported as "erosion" if the film was visually damaged or abraded or a reduction of film thickness was detected or "no erosion" if no visible damage or abrasion or reduction in film thickness was detected.

Cleaning Ability on Test Panels with Brush Module

After fouling exposure the panels were dismounted from the raft and transported in boxes filled with seawater to preserve the fouling on the panels and keep the panels in immersed condition. Each panel was fastened to the mounting plate for testing of cleaning ability by the brush module. The cleaning ability was tested with up to four brushes at 4 rpm, a horizontal speed of 0.012 m/s and compressions as given in Tables 15 and 16 below. This corresponds to 6 strokes of each lamella/bristle tuft/brush strip per the specified area that is referred to above. Evaluation of cleaning ability was performed by visual inspection. The panels were rated as clean (C) or having fouling remaining (F) if all fouling was not removed.

Abrasion Resistance on Vessels in Service with Brush Module

The frame of the brush module was attached to selected parts of hulls of vessels in service using divers. The brush module was attached to the frame and the brush was run over the surface with the set compression as given in Table 13. The brush was run over the surface at a horizontal speed of 0.012 m/s and 90 rpm. This corresponds to 540 strokes of each bristle tuft or each brush strip per the specified area that is referred to above. After brush operation a sample of the coating system was taken in the transition between the area operated by the brush and the area not operated by the brush. The sample size was minimum 2 cm$^2$ to ensure that it was big enough to cover the transition area. The evaluation of abrasion resistance was performed using an optical microscope. The samples were embedded in epoxy resin. After curing, the samples were cut to expose the crosscut of the film, then polished so that a cross section of the coating film could be examined with an optical microscope. The amount of film removal where the brush had operated was measured as the reduction in film thickness compared to the adjacent area not operated by the brush. All measurements were made using a digital camera and calibrated software. The results are reported as "erosion" if a reduction in film thickness was detected or "no erosion" if no reduction in film thickness was detected.

Abrasion Resistance on Vessels in Service with Robot

The robot 102 was run over selected areas of hulls of selected vessels in service using different brushes with compression given in Table 13. Abrasion resistance was evaluated both by sampling followed by measurement of film thickness removal and/or by evaluation of video and photo documentation. The sample size was minimum 2 cm$^2$ to ensure that it was big enough to cover the transition area. The evaluation of abrasion resistance was identical to that reported above for vessels in service with the brush module.

Abrasion Resistance on Idle Vessel with Robot

The robot 102 was run over the hull of the idle vessel using different brushes with the compression given in Table 14. Abrasion resistance was evaluated by inspection by cameras on the robot. The results are reported as "erosion" if an abrasion of the surface was detected or "no erosion" if no abrasion of the surface was detected.

Results

The fouling rating on the test panels, idle vessel and vessels in service were made before testing. The results are shown in Tables 10a and 10b below. For test panels in Singapore fouling rating is given after the given number of weeks of exposure.

TABLE 10a

| Fouling rating on test panels and idle vessel before testing | | |
| --- | --- | --- |
| Fouling rating | | |
| Test panels Sandefjord | Test panels Singapore | Idle vessel |
| C1    Hard50 | | |
| C2    Soft20 | 1 week: Hard50-Barnacles 1 mm<br>2 weeks: Hard50-Barnacles 2 mm<br>4 weeks: Hard50-Barnacles 7 mm | Soft20 |

TABLE 10a-continued

Fouling rating on test panels and idle vessel before testing

| | Fouling rating | |
|---|---|---|
| Test panels Sandefjord | Test panels Singapore | Idle vessel |
| C3 Soft20 | | |
| C4 Soft20 | | |
| C5 Soft20 | 1 week: Soft20 / 2 weeks: Hard50-Barnacles 0.5-1 mm | Soft20 |

TABLE 10a-continued

Fouling rating on test panels and idle vessel before testing

| | Fouling rating | |
|---|---|---|
| Test panels Sandefjord | Test panels Singapore | Idle vessel |
| C6 Soft20 | 1 week: Hard50-Barnacles 0.5-1 mm / 2 weeks: Hard50-Barnacles 1-2 mm | Soft20 |
| C7 Soft20 | 1 week: Hard50-Barnacles 0.5-1 mm / 2 weeks: Hard50-Barnacles 1-2 mm | Soft20 |

TABLE 10b

Fouling rating on vessels in service before testing

| Coating | Fouling rating |
|---|---|
| C2 | Soft30 |
| C5 | Soft20 |
| C6 | Soft20 |
| C7 | Soft20 |

The results of abrasion testing on test panels exposed in Sandefjord are shown in Tables 11a (soft and medium coatings) and 11b (hard coatings). The results of abrasion testing on test panels exposed in Singapore are shown in Table 12. The results show that whilst some module configurations do not cause damage to the coatings, others do. More specifically, with a soft hardness coating, the lamellar brush did not cause any coating damage whereas the tufted bristle brush caused coating damage in all of the conditions tested. For the medium hardness coating, the lamellar brush did not cause any coating damage. With the tufted bristle brush, it is important that that the bristle diameter is 1 mm or less and that the degree of compression is relatively low (e.g. <20% of the height of the bristles). The number of brush strokes was 855 or less. For the hard coating tested in this experiment, none of the module configurations tested caused damage to the coating.

The results of abrasion testing on coatings present on in-service vessels and idle vessels with both the robot and the module are shown in Tables 13 and 14. The results corroborate the results obtained from testing panels. With coatings of medium hardness, tufted bristle brushes and strip roller brushes, with bristles having a diameter of greater than 1 mm, cause coating damage whereas tufted bristle brushes and strip roller brushes, with a bristle diameter of 0.5 mm do not cause damage, at a compression of 4% of the height of the bristles. With hard coatings, none of the configurations tested caused any coating damage.

TABLE 11a

Abrasion resistance testing on test panels exposed in Sandefjord with brush module (N = no erosion, E = erosion, NT = not tested)

| | Brush 1A | Brush 2A | | | | | | Brush 3A | | | | Brush 4A | | |
|---|---|---|---|---|---|---|---|---|---|---|---|---|---|---|
| Compression (mm) | 4 | 1 | 1 | 1 | 6 | 6 | 11 | 1 | 1 | 6 | 11 | 1 | 4 | 8 |
| Compression (%) | 22 | 4 | 4 | 4 | 24 | 24 | 44 | 4 | 4 | 24 | 44 | 4 | 16 | 32 |
| Time (s) | 15 | 15 | 30 | 60 | 15 | 30 | 15 | 15 | 30 | 15 | 15 | 15 | 15 | 15 |
| | 30 | | | | 60 | 30 | | 60 | 30 | 30 | | 30 | 30 | |
| | 60 | | | | | 60 | | | | 60 | | 60 | | |
| C1 - soft | N | E | E | E | E | E | E | E | E | E | E | E | E | E |
| C2 - medium | N | N | N | E | E | E | E | N | E | E | E | E | E | E |
| C3 - medium | N | N | N | NT | E | E | E | N | E | E | E | E | E | E |
| C4 - medium | N | N | N | E | NT | E | E | N | E | E | E | E | E | E |

TABLE 11b

Abrasion resistance testing on test panels exposed in Sandefjord with brush module (N = no erosion)

| | Brush 1A | Brush 2A | | | Brush 3A | | | Brush 4A | | |
|---|---|---|---|---|---|---|---|---|---|---|
| Compression (mm) | 4 | 1 | 6 | 11 | 1 | 6 | 11 | 1 | 4 | 8 |
| Compression (%) | 22 | 4 | 24 | 44 | 4 | 24 | 44 | 4 | 16 | 32 |
| Time (s) | 15 | 15 | 15 | 15 | 15 | 15 | 15 | 15 | 15 | 15 |
| | 30 | 30 | 30 | 30 | 30 | 30 | 30 | 30 | 30 | 30 |
| | 60 | 60 | 60 | 60 | 60 | 60 | 60 | 60 | 60 | 60 |
| C5 - hard | N | N | N | N | N | N | N | N | N | N |
| C6 - hard | N | N | N | N | N | N | N | N | N | N |
| C7 - hard | N | N | N | N | N | N | N | N | N | N |

TABLE 12

Abrasion resistance testing on test panels exposed in Singapore with brush module (N = no erosion, E = erosion)

| | Brush 2A | Brush 3A | Brush 4A |
|---|---|---|---|
| Compression (mm) | 1 | 1 | 1 |
| Compression (%) | 4 | 4 | 4 |
| C2-medium | N | N | E |
| C3-medium | N | N | E |
| C4-medium | N | N | E |
| C5-hard | N | N | N |
| C6-hard | N | N | N |
| C7-hard | N | N | N |

TABLE 13

Abrasion resistance testing on coating on in-service vessels with brush module and robot (one pass) (N = no erosion, E = tested)

| | Brush module | | Robot | | |
| --- | --- | --- | --- | --- | --- |
| | Brush 2A | Brush 3A | Brush 1B | Brush 2B | Brush 3B |
| Compression (mm) | 3 | 3 | 3 | 3 | 3 |
| Compression (%) | 12 | 12 | 17 | 8 | 8 |
| C2-medium | N | E | NT | N | E |
| C5-hard | NT | NT | N | N | N |
| C6-hard | NT | NT | N | N | N |
| C7-hard | NT | NT | N | N | N |

TABLE 14

Abrasion resistance testing on coating on idle vessel with robot (one pass) (N = no erosion, NT = not tested)

| | Brush 1B | Brush 2B | Brush 3B |
| --- | --- | --- | --- |
| Compression (mm) | 3 | 3 | 3 |
| Compression (%) | 17 | 8 | 8 |
| C2-medium | N | N | NT |
| C5-hard | N | N | N |
| C6-hard | N | N | N |
| C7-hard | N | N | N |

The results of cleaning ability testing on test panels exposed in Sandefjord, with the brush module are shown in Table 15 below. The results from the abrasion testing, reported above, are also shown since the aim is to achieve cleaning, without causing any damage to the coating. E/N means at least some of the test conditions caused erosion of the coating.

TABLE 15

(C = clean, F = fouling remaining, N = no erosion, E = erosion)

| | | Brush module | | | |
| --- | --- | --- | --- | --- | --- |
| | | Brush 1A | Brush 2A | Brush 3A | Brush 4A |
| | | Compression: 4 mm | Compression: 1 mm | Compression: 1 mm | Compression: 1 mm |
| | Fouling level | Compression: 22% | Compression: 4% | Compression: 4% | Compression: 4% |
| C1 | Hard50 | C (abrasion testing: N) | C (abrasion testing: E) | C (abrasion testing: E) | C (abrasion testing: E) |
| C2 | Soft20 | C (abrasion testing: N) | C (abrasion testing: E/N) | C (abrasion testing: E/N) | C (abrasion testing: E) |
| C3 | Soft20 | C (abrasion testing: N) | C (abrasion testing: E/N) | C (abrasion testing: E/N) | C (abrasion testing: E) |
| C4 | Soft20 | C (abrasion testing: N) | C (abrasion testing: E/N) | C (abrasion testing: E/N) | C (abrasion testing: E) |

The results show that it is critical to match the robot configuration to the type of coating present. Specifically, the results show that only certain robot configurations achieve cleaning, without causing damage to the coating. The provision of a configurable robot is therefore highly advantageous as its configuration can always be adapted to match the coating, and in particular the hardness of the coating, it is to clean.

The results show that with a soft coating, such as C1, it is important to use a lamellar brush to avoid causing coating damage. With a compression of 22% of the height of the lamellas and a number of brush strokes of 1710 or less per the specified area referred to above, this configuration achieves cleaning of fouling of the level Hard50 without causing coating damage. This cleaning configuration is suitable for proactive cleaning wherein the aim is to keep fouling at a very low level, i.e. clean more frequently to avoid the fouling increasing. Of course, if cleaning is carried out more frequently it is even more important that the cleaning process itself does not damage the coating.

The results also show that with medium hardness coatings, such as C2-C4, it is possible to use a lamellar brush or a tufted bristle brush, without causing damage to the coating. However with a tufted bristle brush, it is important to use a compression of less than 20% of the height of the bristles and a number of brush strokes of 855 or less per the specified area referred to above, to avoid causing coating damage. With this configuration, the robot achieves cleaning of fouling of the level Soft20. Again this configuration is suitable for proactive cleaning.

The results of cleaning ability testing on test panels exposed in Singapore, after a given number of weeks exposure, with the brush module are shown in Table 16 below. The results from abrasion testing, reported above, are also shown in brackets since the aim is to achieve cleaning without causing any damage to the coating. As mentioned above, this is particularly important in proactive cleaning regimes wherein cleaning is carried out relatively frequently.

The results show that it is critical to configure a proactive cleaning robot to suit the coating to be cleaned. First it is important to avoid damaging the coating, particularly if the coating is a soft hardness coating or a medium hardness coating. This is shown in the results obtained using brush 4A, which is a tufted bristle brush, with bristles having a diameter of 1.2 mm. With this brush, even at the lowest compression level (4% of the height of the bristles), damage to the coating occurred during abrasion testing.

At the same time it is essential that the robot is configured in such a way that cleaning is achieved. The results show that the optimum robot configuration depends on the coating and on the level of fouling present thereon. For coating C2, a medium hardness coating, the best balance of cleaning, whilst not causing any damage, was with brush 3A, a tufted bristle brush, with a bristle diameter of 1 mm, at a compression of 4% of the height of the bristles. The results show that the cleaning is able to remove fouling of level Hard50, with barnacles up to 2 mm in size. The fact that larger barnacles cannot be removed shows that the frequency with which the robot should clean any given area of hull with this configuration should be for example every 2 weeks. How fast fouling organisms settle and grow depends on type of coating, geography and seasonal variations.

For coating C5, a hard coating, the best balance of cleaning, whilst not causing any damage, was with brushes 3A or 4A. Both of these are tufted bristle brushes, and they have bristle diameters of 1 mm and 1.2 mm respectively. With a compression of 4% of the height of the bristles, this robot configuration achieved cleaning of fouling level of Hard50, including barnacles of 0.5-1 mm. Brush 2A, which is a tufted bristle brush, but with a bristle diameter of 0.5 mm was not able to clean fouling of level Hard50. Thus if this brush was chosen, proactive cleaning would need to be carried out sufficiently regularly to keep the antifouling level at or below soft20 which this configuration is able to clean.

For coatings C6 and C7, which are also hard coatings, each of the robot configurations tested, at a compression of 4% of the height of the bristles, were able to clean fouling level Hard50 with barnacles of size 0.5-1 mm. This configuration does not cause coating damage. However, none of these configurations were able to remove larger barnacles of 1-2 mm in size. Thus this robot needs to be configured to clean surfaces, such as hulls, before the barnacles have grown larger than 1 mm in size.

Overall, the results show that for proactive cleaning of hulls, it is critical to configure the cleaning robot to match or suit the type of coating present on the hull as well as the level of fouling present thereon. It is critical to identify a robot configuration that does not damage the coating, and in particular its antifouling performance, but which still achieves cleaning. The results show that this can be done by configuring the robot so that the geometry of brush, the bristle diameter, the compression, the number of brush strokes and the frequency of cleaning is appropriate for the coating type.

For soft hardness coatings, as herein defined, the robot is preferably configured with:

a lamellar brush;

a degree of compression of less than 56% of the height of the plurality of lamellas, preferably 5-56%, more preferably 5-28% and still more preferably 11-22%; and a number of brush strokes of less than 5000 per the specified area referred to above, preferably 5 to 3400, more preferably 5 to 1280 and still more preferably 6 to 855.

For medium hardness coatings, as herein defined, the robot is preferably configured with:

a lamellar brush;

a degree of compression of less than 56% of the height of the plurality of lamellas, preferably 5-56%, more preferably 5-28%, and still more preferably 11-22%; and a number of brush strokes of less than 5000 per the specified area referred to above, preferably 5 to 3400, more preferably 6 to 1280.

or:

a tufted bristle brush or strip roller brush;

a bristle diameter of 1 mm or less, preferably 0.2-0.75 mm and more preferably 0.3-0.6 mm;

a degree of compression of less than 20% of the bristle length of the bristles, preferably 2-16% and more preferably 2-12%; and a number of brush strokes of less than 1710 per the specified area referred to above, preferably 5 to 1280, more preferably 6 to 1280 and yet more preferably 6 to 855.

For hard hardness coatings, as herein defined, the robot is preferably configured with:

a tufted bristle brush or strip roller brush;

a bristle diameter of 0.5-2 mm, preferably 0.5-1.5 mm;

a degree of compression of 4-60% of the bristle length of the bristles, preferably 4-48% and more preferably 4-28%; and a number of brush strokes of less than 17,000 per the specified area referred to above, preferably 5 to 12,000, more preferably 6 to 10,000 and still more preferably 6 to 5000.

In embodiments of the present disclosure the robot 102 can determine that the robot requires reconfiguring to modify how its cleaning is performed. This reconfiguring may be performed by the robot 102 itself e.g. by the processor controlling the degree of compression to be applied by the cleaning brush or controlling the number of strokes per contact area with the brush. Alternatively or additionally, this reconfiguring may need to be performed by a user with access to the robot, and therefore in these scenarios the processor 202 is configured to control the robot to travel to the robot station 104 on the vessel 100. This enables the user to change the brush type, the degree of compression to be applied by the cleaning brush (whereby the brush position adjustment mechanism is manually adjustable), the bristle diameter (e.g. by replacing brush strips of a strip roller brush) etc.

In some embodiments of the present disclosure the robot 102 can determine that the robot requires reconfiguring based on its location on the hull of the vessel. That is, it will be appreciated that the hull of a vessel may not be coated with the same final coating on the entire hull, and instead different coatings may be used as a final coat for different areas/zone of the hull. For example, a first class of coating may be applied to the flat bottom of the hull, a second class of coating may be applied to the lower vertical side of the hull, and a third class of coating may be applied to the upper vertical side of the hull, whereby the first, second and third coating classes have different hardnesses. In these scenarios it is advantageous for the robot 102 that is configured for optimal cleaning of a first coating to detect that its current configuration is sub-optimal after it has travelled, during its cleaning operation, to an area of the hull that is coated with a second coating wherein the second coating has a different hardness to the first coating and therefore the robot 101 requires reconfiguration.

It will be appreciated that a user of the robot 102 may program the robot to define different areas/zones of the hull of a vessel and associate these zones with a respective set of cleaning parameters (e.g. brush type, bristle diameter, degree of compression, number of strokes per contact area with the brush etc.) based on their knowledge of the class of coating applied to that area/zone. The location dependent cleaning parameters may be stored in memory 210. In these embodiments, upon detecting that the robot 102 has travelled to a different area/zone of the hull of the vessel, the CPU 202 is configured to query the memory 210 and retrieve the cleaning parameters associated with the robot's current location and implement the step of reconfiguring as described above.

As noted above, the robot 102 may detect its location on the hull of the vessel in a number of ways. In one example, the robot 102 detects its location on the hull of the vessel based on a location sensor 212 on the robot 102 detecting a signal emitted from a beacon located on the vessel. In another example, the robot 102 detects its location on the hull of the vessel based on receiving a message from a beacon on the vessel in response to the robot 102 travelling within range of the beacon. In another example, the robot 102 detects its location on the hull of the vessel based on receiving a message from a computing device 106 on the vessel, whereby the computing device 106 identifies the location of the robot 102 based on receiving location data from a beacon on the vessel in response to the robot 102 travelling within range of the beacon.

For example, a user may initially configure the robot 102 for cleaning a surface of a soft hardness coating. The preferable configuration of the robot 102 for cleaning a surface of a soft hardness coating is described above. Upon detecting that the robot 102 has travelled to an area of the vessel that is coated with a hard hardness coating the cleaning control module 206 may control the robot 102 to return to the robot station 104 to allow a user to switch the lamellar brush to either a bristle brush or strip roller brush. In this example, the cleaning control module 206 may communicate with the brush position adjustment mechanism to electronically increase the degree of compression applied by the brush. It will be appreciated that the return to the docking station would allow the user to increase the degree of compression in examples whereby the brush position adjustment mechanism is manually adjustable.

In some embodiments of the present disclosure the robot 102 can determine that the robot requires reconfiguring based on a degree of fouling on the coated surface that is being cleaned. As noted above, the robot 102 may detect the degree of fouling on the coated surface that is being cleaned in a number of ways. In one example, the robot 102 detects the degree of fouling on the coated surface that is being cleaned based on receiving fouling data from a fouling sensor on the robot. In another example, the robot 102 detects the degree of fouling on the coated surface that is being cleaned based on receiving fouling data from a fouling sensor on the vessel. That is, the robot 102 may be configured to receive fouling data from a fouling sensor on the vessel when the robot 102 is in proximity to the fouling sensor.

For example, whilst cleaning a surface coated with a soft hardness coating (or other coating class) the cleaning control ware, firmware, hardware (e.g., fixed logic circuitry), or a combination of these implementations. The terms "functionality" and "module" as used herein generally represent software, firmware, hardware, or a combination thereof. In the case of a software implementation, the functionality or module represents program code that performs specified tasks when executed on a processor (e.g. CPU or CPUs). The program code can be stored in one or more computer readable memory device (e.g. memory 210). The features of the techniques described below are platform-independent, meaning that the techniques may be implemented on a variety of commercial computing platforms having a variety of processors.

While the present disclosure has been particularly shown and described with reference to preferred embodiments, it will be understood to those skilled in the art that various changes in form and detail may be made without departing from the scope of the present disclosure as defined by the appendant claims.

TABLE 16

| (C = clean, F = fouling remaining, N = no erosion, E = erosion | | | |
| --- | --- | --- | --- |
| | | Brush module | |
| Fouling level | Brush 2A Compression: 1 mm Compression: 4% | Brush 3A Compression: 1 mm Compression: 4% | Brush 4A Compression: 1 mm Compression: 4% |
| C2-medium | 1 week: Hard50 Barnacles 1 mm 2 weeks: Hard50 Barnacles 2 mm 4 weeks: Hard50 Barnacles 7 mm | 1 week: C 2 weeks: F 4 weeks: F (abrasion testing: N) | 1 week: C 2 weeks: C 4 weeks: F (abrasion testing: N) | 1 week: C 2 weeks: C 4 weeks: C (abrasion testing: E) |
| C5-hard | 1 week: Soft20 2 weeks: Hard50 Barnacles 0.5-1 mm | 1 week: C 2 weeks: F (abrasion testing: N) | 1 week: C 2 weeks: C (abrasion testing: N) | 1 week: C 2 weeks: C (abrasion testing: N) |
| C6-hard | 1 week: Hard50 Barnacles 0.5-1 mm 2 weeks: Hard50 Barnacles 1-2 mm | 1 week: C 2 weeks: F (abrasion testing: N) | 1 week: C 2 weeks: F (abrasion testing: N) | 1 week: C 2 weeks: F (abrasion testing: N) |
| C7-hard | 1 week: Hard50 Barnacles 0.5-1 mm 2 weeks: Hard50 Barnacles 1-2 mm | 1 week: C 2 weeks: F (abrasion testing: N) | 1 week: C 2 weeks: F (abrasion testing: N) | 1 week: C 2 weeks: F (abrasion testing: N) | module 206 may determine that the degree of fouling exceeds a predetermined fouling threshold and thus the configuration of the robot 102 is sub-optimal for cleaning a high level of fouling and therefore implement the step of reconfiguring as described above (e.g. by controlling the degree of compression to be applied by the cleaning brush or returning to the robot station 104).

It will be appreciated that a user of the robot 102 may program the robot to define, for each class of coating, a predetermined fouling threshold. The predetermined fouling threshold associated with each coating class may be stored in memory 210. In these embodiments, the CPU 202 is configured to query the memory 210 and retrieve the predetermined fouling threshold associated with the coating class of the coating being cleaned and upon determining that the degree of fouling exceeds the predetermined fouling threshold implement the step of reconfiguring as described above.

Generally, any of the functions described herein with reference to the robot 102 can be implemented using soft-

The invention claimed is:

1. A robot configured to clean a surface of a coating applied to a hull of a vessel whilst travelling over said hull, wherein the coating has a König pendulum hardness of less than 75 counts, the robot comprising:
   a cleaning brush assembly which comprises a lamellar cleaning brush, the lamellar cleaning brush comprising a plurality of lamellas extending outwardly from a brush core and having a height, the lamellar cleaning brush being arranged to rotate about its axis to apply a cleaning action to the surface when it is in contact with the surface;
   wherein the robot is configured to apply a degree of compression of the lamellar cleaning brush on the surface such that the lamellar cleaning brush is held in a position a distance, towards the surface of the coating, away from an initial position at which the lamellar cleaning brush is in contact with, but not deformed by, the surface of the coating, wherein said distance is less than 56% of the height of the plurality of lamellas.

2. The robot of claim 1, wherein said distance is 5-56% of the height of the plurality of lamellas.

3. The robot of claim 1, further comprising a processor configured to control the robot to travel over an area of the hull such that each lamella applies a number of brush strokes during said cleaning action to said area, wherein said area has a width of 5 mm and a length corresponding to a length of the lamellar cleaning brush.

4. The robot of claim 1, wherein the coating has pendulum hardness of less than 30 counts.

5. The robot of claim 1, wherein the coating has pendulum hardness between 30 to 74 counts.

6. A robot configured to clean a surface of a coating applied to a hull of a vessel whilst travelling over said hull, wherein the coating has a König pendulum hardness between 30 to 74 counts, the robot comprising:

a cleaning brush assembly which comprises a cleaning brush, the cleaning brush being arranged to rotate about its axis to apply a cleaning action to the surface when it is in contact with the surface, wherein the cleaning brush comprises bristles having a bristle length, the bristles having a bristle diameter of 1 mm or less;

wherein the robot is configured to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is less than 20% of the bristle length of the bristles; and the robot further comprising a processor configured to:

determine a location of the robot on the hull of the vessel;

query a memory coupled to said processor to identify one or more cleaning parameters associated with the determined location; and determine that the robot requires reconfiguration based on the one or more identified cleaning parameters;

wherein the processor is configured to determine a location of the robot on the hull of the vessel based on receiving location data from at least one of:

a location sensor on the robot;

a location sensor on the vessel, the robot comprising a communication interface for receiving the location data from said location sensor; or a computing device, the robot configured to receive the location data from the computing device via said communication interface.

7. The robot of claim 6, wherein said distance is 2-16% of the bristle length of the bristles.

8. The robot of claim 6, wherein the bristles have a bristle diameter of 0.2 to 0.75 mm.

9. The robot of claim 6, wherein the bristles of the cleaning brush are arranged in a plurality of tufts mounted to a core of the cleaning brush.

10. The robot of claim 6, further comprising a processor configured to control the robot to travel over an area of the hull such that each tuft of bristles applies a number of brush strokes during said cleaning action to said area wherein said area has a width of 5 mm and a length corresponding to a length of the cleaning brush.

11. The robot of claim 6, wherein the bristles of the cleaning brush are arranged in a plurality of brush strips.

12. The robot of claim 11, further comprising a processor configured to control the robot to travel over an area of the hull such that each brush strip applies a number of brush strokes during said cleaning action to said area, wherein said area has a width of 5 mm and a length corresponding to a length of the cleaning brush.

13. The robot of claim 6, wherein the cleaning brush assembly comprises a brush position adjustment mechanism for controlling said degree of compression.

14. The robot of claim 6, further comprising a processor configured to:

determine a location of the robot on the hull of the vessel;

query a memory coupled to said processor to identify a further coating applied to the hull of the vessel at said location; and determine that the robot requires reconfiguration based on the identified further coating;

wherein the processor is configured to determine a location of the robot on the hull of the vessel based on receiving location data from at least one of:

a location sensor on the robot;

a location sensor on the vessel, the robot comprising a communication interface for receiving the location data from said location sensor; and a computing device, the robot configured to receive the location data from the computing device via said communication interface.

15. The robot of claim 6, further comprising a processor configured to:

determine a degree of fouling on the surface of a coating; and determine that the robot requires reconfiguration based on the degree of fouling;

wherein the processor is configured to determine a degree of fouling on the surface of a coating based on receiving fouling data from at least one of:

a fouling sensor on the robot;

a fouling sensor on the vessel, the robot comprising a communication interface for receiving the fouling data from said fouling sensor; and a computing device, the robot configured to receive the fouling data from the computing device via said communication interface.

16. A robot configured to clean a surface of a coating applied to a hull of a vessel whilst travelling over said hull, wherein the coating has a König pendulum hardness greater than or equal to 75 counts, the robot comprising:

a cleaning brush assembly which comprises a cleaning brush, the cleaning brush being arranged to rotate about its axis to apply a cleaning action to the surface when it is in contact with the surface, wherein the cleaning brush comprises bristles having a bristle length, the bristles having a bristle diameter of 0.5 to 2 mm;

wherein the robot is configured to apply a degree of compression of the cleaning brush on the surface such that the cleaning brush is held in a position a distance towards the surface of the coating, away from an initial position at which the cleaning brush is in contact with, but not deformed by, the surface of the coating, wherein said distance is 4 to 60% of the bristle length of the bristles; and the robot further comprising a processor configured to:

determine a location of the robot on the hull of the vessel;

query a memory coupled to said processor to identify one or more cleaning parameters associated with the determined location; and determine that the robot requires reconfiguration based on the one or more identified cleaning parameters;

wherein the processor is configured to determine a location of the robot on the hull of the vessel based on receiving location data from at least one of:

a location sensor on the robot;

a location sensor on the vessel, the robot comprising a communication interface for receiving the location data from said location sensor; or a computing device, the robot configured to receive the location data from the computing device via said communication interface.

17. The robot of claim 16, wherein said distance is 4 to 48% of the bristle length of the bristles.

18. The robot of claim 16, wherein the bristles have a bristle diameter of 0.5 to 1.5 mm.

19. The robot of claim 16, wherein the bristles of the cleaning brush are arranged in a plurality of tufts mounted to a core of the cleaning brush.

20. The robot of claim 19, further comprising a processor configured to control the robot to travel over an area of the hull such that each tuft of bristles applies a number of brush strokes during said cleaning action to said area, wherein said area has a width of 5 mm and a length corresponding to a length of the cleaning brush.

21. The robot of claim 16, wherein the bristles of the cleaning brush are arranged in a plurality of brush strips.

22. The robot of claim 21, further comprising a processor configured to control the robot to travel over an area of the hull such that each brush strip applies a number of brush strokes during said cleaning action to said area, wherein said area has a width of 5 mm and a length corresponding to a length of the cleaning brush.

23. The robot of claim 16, wherein the cleaning brush assembly comprises a brush position adjustment mechanism for controlling said degree of compression.

24. The robot of claim 16, further comprising a processor configured to:

determine a location of the robot on the hull of the vessel;

query a memory coupled to said processor to identify a further coating applied to the hull of the vessel at said location; and determine that the robot requires reconfiguration based on the identified further coating;

wherein the processor is configured to determine a location of the robot on the hull of the vessel based on receiving location data from at least one of:

a location sensor on the robot;

a location sensor on the vessel, the robot comprising a communication interface for receiving the location data from said location sensor; and a computing device, the robot configured to receive the location data from the computing device via said communication interface.

25. The robot of claim 16, further comprising a processor configured to:

determine a degree of fouling on the surface of a coating; and determine that the robot requires reconfiguration based on the degree of fouling;

wherein the processor is configured to determine a degree of fouling on the surface of a coating based on receiving fouling data from at least one of:

a fouling sensor on the robot;

a fouling sensor on the vessel, the robot comprising a communication interface for receiving the fouling data from said fouling sensor; and a computing device, the robot configured to receive the fouling data from the computing device via said communication interface.

* * * * *